(12) United States Patent
Hatstat et al.

(10) Patent No.: US 9,916,489 B2
(45) Date of Patent: Mar. 13, 2018

(54) MULTI-FRAME SUPER-RESOLUTION BARCODE IMAGER

(71) Applicant: Datalogic Automation, Inc., Telford, PA (US)

(72) Inventors: Andrew Hatstat, Lansdale, PA (US); David Kliebhan, Newtown, PA (US); Andrei Talapov, Lansdale, PA (US)

(73) Assignee: Datalogic Automation, Inc., Telford, PA (US)

( * ) Notice: Subject to any disclaimer, the term of this patent is extended or adjusted under 35 U.S.C. 154(b) by 0 days.

(21) Appl. No.: 15/358,046

(22) Filed: Nov. 21, 2016

(65) Prior Publication Data

US 2017/0076128 A1 Mar. 16, 2017

Related U.S. Application Data

(62) Division of application No. 14/819,300, filed on Aug. 5, 2015, now Pat. No. 9,501,683.

(51) Int. Cl.
*G06K 19/00* (2006.01)
*G06K 7/14* (2006.01)
*G06K 7/10* (2006.01)
*G06T 1/00* (2006.01)

(52) U.S. Cl.
CPC ....... *G06K 7/1491* (2013.01); *G06K 7/10762* (2013.01); *G06K 7/1465* (2013.01); *G06T 1/00* (2013.01); *G06K 7/10811* (2013.01)

(58) Field of Classification Search
USPC ................. 235/435, 439, 454, 462
See application file for complete search history.

(56) References Cited

U.S. PATENT DOCUMENTS

| 5,510,604 | A | 4/1996 | England |
| 5,837,985 | A | 11/1998 | Karpen |
| 7,097,311 | B2 | 8/2006 | Jaynes et al. |
| 7,215,493 | B2 | 5/2007 | Olmstead et al. |
| 7,483,559 | B2 | 1/2009 | Luk-Pat et al. |
| 7,506,816 | B2 | 3/2009 | Olmstead |

(Continued)

FOREIGN PATENT DOCUMENTS

| CN | 102708552 A | 10/2012 |
| WO | 99/30269 | 6/1999 |

OTHER PUBLICATIONS

Oktem, Rusen and Oktem, Levent, "A Superresolution Approach for Bar Code Reading," Electrical and Electronics Engineering Department, Attilm University, Kizilcasar Koyu, Incek, Ankara, Turkey, 2005.

(Continued)

*Primary Examiner* — Matthew Mikels
(74) *Attorney, Agent, or Firm* — Dentons US LLP

(57) ABSTRACT

A system and method for reading a machine readable code associated with an object moving relative to an imaging device may include capturing a first image of the machine readable code at a first resolution. A second image of the machine-readable code with a non-integer pixel shift in alignment at the first resolution may be captured. An interleaved image may be formed from the first and second images. An image of the machine-readable code may be generated at a second resolution using the interleaved image, where the second resolution is higher than the first resolution.

32 Claims, 18 Drawing Sheets

(56) References Cited

U.S. PATENT DOCUMENTS

| | | | |
|---|---|---|---|
| 8,411,922 | B2 | 4/2013 | Lee et al. |
| 8,646,690 | B2 | 2/2014 | Nunnink et al. |
| 8,682,089 | B2 | 3/2014 | Wedi |
| 8,682,098 | B2 | 3/2014 | Hiraga et al. |
| 8,724,188 | B2 | 5/2014 | Smith |
| 8,762,852 | B2 | 6/2014 | Davis et al. |
| 8,905,314 | B2 | 12/2014 | van der Merwe et al. |
| 8,915,443 | B2 | 12/2014 | Deppleri et al. |
| 9,007,490 | B1 | 4/2015 | Yuan et al. |
| 2005/0057664 | A1* | 3/2005 | Palum .................. H04N 3/1593 348/222.1 |
| 2012/0091204 | A1 | 4/2012 | Shi |
| 2013/0163876 | A1 | 6/2013 | Silver et al. |
| 2013/0177242 | A1 | 7/2013 | Adams, Jr. et al. |
| 2013/0188040 | A1 | 7/2013 | Kamen et al. |
| 2013/0223673 | A1 | 8/2013 | Davis et al. |
| 2014/0052555 | A1 | 2/2014 | MacIntosh |
| 2014/0072242 | A1 | 3/2014 | Wei et al. |
| 2014/0118460 | A1 | 5/2014 | Bivolarsky et al. |
| 2014/0125825 | A1 | 5/2014 | Baer et al. |

OTHER PUBLICATIONS

Bailey, Donald G., "Super-resolution of bar codes," Institute of Information Sciences and Technology, Massey University, New Zealand, Journal of Electronic Imaging, pp. 213-220, Jan. 2001.

Pickup, Lyndsey C., "Machine Learning in Multi-frame Image Super-resolution," Robotics Research Group, Department of Engineering Science, University of Oxford, 2007.

Su, Kevin, "Introduction to Image Super-resolution," http://www.cs.utsa.edu/-qitian/seminar/Fa1104/superresolution/SR_slides_xsu.pdf.

Photo Acute, "Superresolution FAQ," http://photoacute.com/tech/superresolution_faq.html.

Campbell, Mikey, Apple Insider, "Future iPhones may use optical image stabilization to create 'super-resolution' images," May 8, 2014, http://appleinsider.com/articles/14/05/08/future-iphones-may-use-optical-image-stabilization-to-create-super-resolution-images.

Lin, Zhouchen and Shum, Heung-Yeung, Fundamental Limits of Reconstruction-Based Superresolution Algorithms under Local Translation, IEEE Transaction on Pattern Analysis and Machine Intelligence, vol. 26, No. 1, Jan. 2004, pp. 83-97.

Van Der Walt, Stefan and Herbst, B.M., "A polygon-based interpolation operator for super-resolution imaging,". Applied Mathematics, Stellenbosch University, http://arxiv.org/pdf/1210.3404v2.pdf.

Chang, Jui-Hsin, "Linear CMOS image sensor with time-delay integration and interlaced super-resolution pixel," Dept. of Electr. Eng., Nat. Tsing Hua Univ., Hsinchu, Taiwan, IEEE Xplor Abstract, http://ieeexplore.ieee.org/xpl/articleDetails.jsp?arnumber=6411292.

* cited by examiner

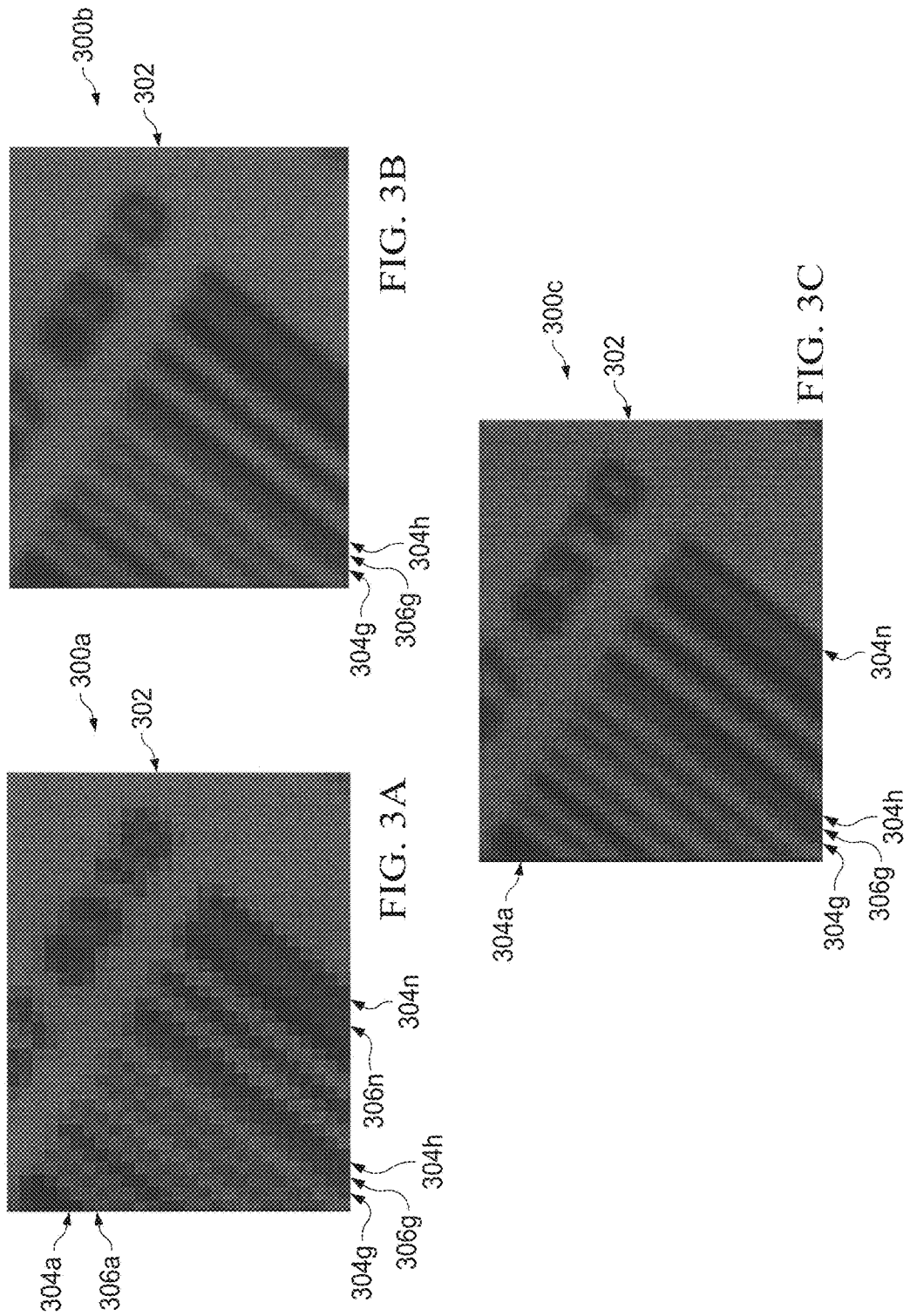

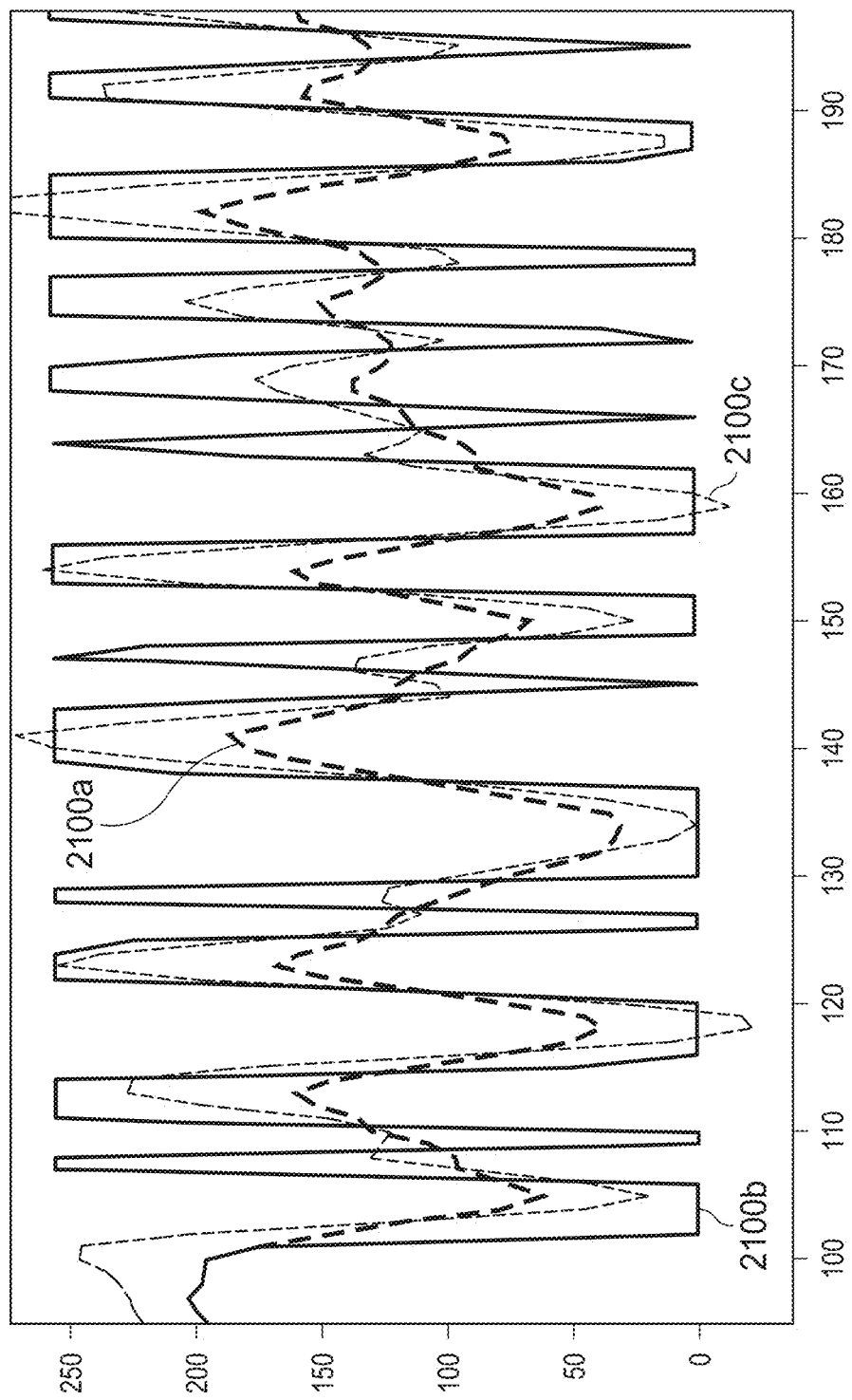

MULTI-FRAME SUPER-RESOLUTION BARCODE IMAGER

RELATED APPLICATIONS

This application is a divisional of U.S. application Ser. No. 14/819,300, filed Aug. 5, 2015, entitled MULTI-FRAME SUPER-RESOLUTION BARCODE IMAGER, the contents of which are hereby incorporated by reference in their entirety.

BACKGROUND

In logistics operations, such as manufacturing, postal, or otherwise, machine-readable codes, hereinafter "codes," generally in the form of barcodes, are widely used to provide for counting and tracking of inventory. The codes are generally applied to objects, such as parcels, and are often transported on conveyor belts and other conveyer systems. Although typically in the form of machine-readable codes, the codes may also be in the form of symbols, alphanumeric indicia, or other form, as further described herein, that may be image processed and identified by a machine, and, thus, considered to be machine-readable codes ("codes"). Because it is typically unknown exactly where the codes will appear on the objects as the objects are transported on a conveyor belt or other forms of transport, an imaging device is positioned at a long-range distance (e.g., 1 m—2.5 m). The camera, such as a linear or standard camera, is used to read the codes positioned on the objects, and a linear image may be captured by linearly scanning an object as the object passes in front of the camera or the camera is moved past an object.

Reading codes on objects that are being conveyed is a challenge for a number of reasons. Such reasons include, but are not limited to, uncertainty of location of barcodes on the items, speed of the items moving relative to a barcode reader, height variation of the objects, image resolution of an image sensor, and so forth. To read a code in these types of applications generally includes a large viewing area of a camera, which may be a linear camera or regular imaging camera. A large viewing area is generally a problem for reading codes because resolution is reduced due to distance of a camera from the object on which the codes are positioned. Less resolution for imaging a code is problematic because lines or other indicia of the codes are closely spaced, and lower resolution causes spaces between the lines or other indicia to be degraded or lost entirely.

One way to improve resolution of an image device used to image codes is to use a sensor with many pixels, such as 40,000 pixels. However, such a sensor is expensive. Another way to address the problem of pixel resolution has been by using multiple cameras with less resolution to image objects across the entire conveyor belt. However, use of multiple cameras, such as three or four cameras to cover the width of a conveyor belt, is expensive and requires processing of images collected by each camera. Another technique to image the codes moving relative to a camera that has been considered includes using a tip/tilt mirror or moving the imaging device relative to the object with the code. The problem with moving a mirror or imaging device is that the conveyor belt on which the objects move is very fast, generally 600 feet/minute or 3.3 meters/second, so mechanics can be difficult to move fast enough to scan an entire region of interest inclusive of the codes. The use of zoom lenses is also possible to increase resolution of a camera, but zoom lenses require moving parts and can be a challenge when imaging moving items.

SUMMARY

To provide for increased resolution of imaging devices to read codes disposed on objects being moved relative to an imaging device, multi-frame super-resolution processing system provides for information from multiple, low-resolution images to create a single, high-resolution image that may be read by a reader of codes. The low-resolution images are slightly different views of the same scene. In providing for the slightly different views, the low-resolution frame is shifted a non-integer number of pixels relative to one another. In one embodiment, sampling of the images at known non-integer pixel shifts may be performed, when range from an image device to the code is known. However, because objects may have different heights, pixel shifts between subsets of pixels may be unknown, and processing to determine alignment between images captured from multiple subsets of subsets of pixels may be performed to determine a non-integer pixel shift.

One embodiment of a method for reading a machine-readable code associated with an object moving relative to an imaging device may include capturing, by a first subset of pixels of a pixel array of the imaging device, a first image of a first portion of the machine-readable code at a first resolution at a first time. A second subset of pixels of the pixel array of the imaging device may capture a second image of the first portion of the machine-readable code at the first resolution at a second time, where the first and second subsets of pixels have a non-integer pixel shift in alignment relative to the first portion of the machine readable code. Successive portions of the machine-readable code associated with the object to form a first image and second image, respectively, of the machine-readable code may be imaged by the first and second subsets of pixels. The images captured by the first and second subsets of pixels may be interleaved to form an interleaved image (e.g., in a matrix in a non-transitory memory). An image of the machine-readable code may be generated at a second resolution using the interleaved image, where the second resolution is higher than the first resolution. In one embodiment, the first and second images may be registered with sub-pixel accuracy prior to interleaving the images.

One embodiment of a system for reading a machine-readable code associated with an object moving relative to an imaging device may include an imaging device configured to capture images of the machine-readable code. The imaging device may include a pixel array in which a first subset of pixels captures a first image of a first portion of the machine-readable code at a first resolution at a first time, and a second subset of pixels captures a second image of the first portion of the machine-readable code at the first resolution at a second time, where the first and second subsets of pixels have a non-integer pixel shift in alignment relative to the first portion of the machine readable code. Successive portions of the machine-readable code associated with the object to form a first image and second image, respectively, of the machine-readable code may be caused to be imaged by the first and second subsets of pixels. A processing unit may be in communication with the imaging device, and be configured to align the first and second subsets of pixels using a non-integer pixel shift, interleave a plurality of images captured by the first and second subsets of pixels to form an interleaved image, and generate an image of the machine-readable code at a second resolution using the interleaved image, the second resolution being higher than the first resolution. In one embodiment, the first and second images may be registered with sub-pixel accuracy prior to interleaving the images.

One embodiment of a system and method for reading a machine readable code associated with an object moving relative to an imaging device may include capturing a first image of the machine readable code at a first resolution. A second image of the machine-readable code with a non-integer pixel shift in alignment at the first resolution may be captured. An interleaved image may be formed from the first and second images. An image of the machine-readable code may be generated at a second resolution using the interleaved image, where the second resolution is higher than the first resolution.

BRIEF DESCRIPTION OF THE DRAWINGS

Illustrative embodiments of the present invention are described in detail below with reference to the attached drawing figures, which are incorporated by reference herein and wherein:

FIG. 3A is an image of an illustrative low-resolution image of a code captured using a single array of pixels of an imaging device;

FIG. 3B is an image of an illustrative high-resolution image formed by interleaving at least two low-resolution images;

FIG. 3C is an image of an illustrative de-blurred high-resolution image;

FIG. 21 is a graph showing curves that illustrate measurements of an original image, ideal image, and deblurred image;

DETAILED DESCRIPTION OF THE DRAWINGS

Figure 1:
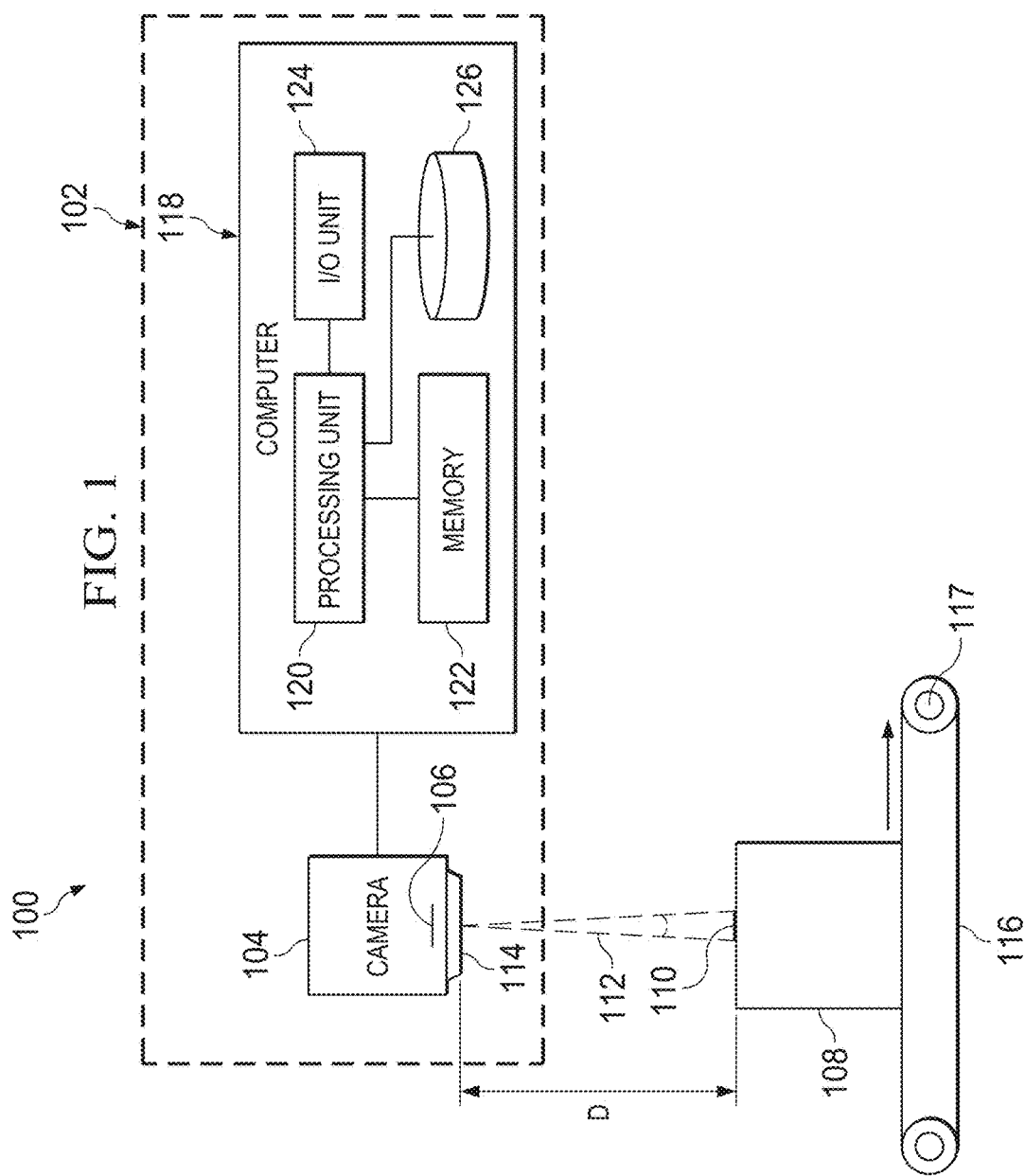
FIG. 1 is an illustration of an illustrative logistics processing environment in which an imaging device inclusive of a dual-line scan camera may be utilized to scan codes on objects being moved relative to the imaging device.

With regard to FIG. 1, an illustration of an illustrative logistics processing environment 100 in which an imaging device 102 inclusive of a dual-line scan camera 104 may be utilized to scan codes on objects, which may range in height, size, and shape, being moved relative to the imaging device 102 is shown. The term imaging device is interchangeably used with the term camera in certain aspects. It should be understood that the camera 104 may be configured to capture images using alternative techniques other than using dual-line imaging. The camera 104 may include a pixel array or optical sensor 106 of which multiple subsets of pixels (not shown) of the pixel array may be used to image an object 108 on which a label 110 inclusive of a code (not shown). The subset of pixels may be linear and be spaced relative to one another, as further described with regard to FIG. 5, for example. The camera 104 may capture an optical image, such as a linear image, of the label 110 with a field-of-view 112 with an angle θ fixed by a lens 114. The angle θ is fixed by the lens focal length and row spacing of the pixel array 106. As a result of the angle θ, two images being captured by distinct subsets of pixels of a pixel array (see FIG. 5, for example) are offset in the direction of travel as a function of the distance D.

The object 108, which may be a parcel, is shown to be positioned on a conveyer belt 116 to be moved in front of the camera 104 for imaging of the label 110. For high-speed logistics processing environments, the conveyer belt 116 may be configured to move at speeds of 600 feet per minute or 3.3 meters per second. To track distance of the object during imaging, a sensor 117, such as an optical encoder, may be used. An output measurement of the sensor 117 may be communicated to a computer 118, which may or may not be integrated with the imaging device 102, for synchronizing imaging by the camera 104 with respect to distance traveled by the object 108. It should be understood that alternative sensors, such as a speedometer, may be used to measure speed of the conveyer belt 116, and a mathematical integral may be performed to determine movement of the object 108. Image resolution in the direction of travel is fixed by frame rate of the pixel array 106, and is independent of distance D from the lens 114 of the camera 104 to the object 108. Pixel overlap increases vertically as the distance increases.

The computer 118 may be configured with a processing unit 120, memory 122, input/output (I/O) unit 124, and storage unit 126, which may be solid-state or other memory type for storing imaging data collected by the camera 104 and processed image data, as described herein. The processing unit 120 may be configured to execute software for imaging and/or processing images of codes applied to or associated with objects. For example, the codes, which may be machine-readable codes, text, icons (e.g., hazardous material), or otherwise, may be affixed to an object as applied to a shipping label, for example, or attached to a carry tray (not shown) on which objects may be placed during logistics processing. The memory 122 may be configured to store software and/or data, such as image data, and be used during processing of image data. The I/O unit 124 may be configured to handle communications with other devices, such as the camera, Internet, position or other sensors of the conveyer, or other devices using one or more communications protocols, as understood in the art.

Figure 5:
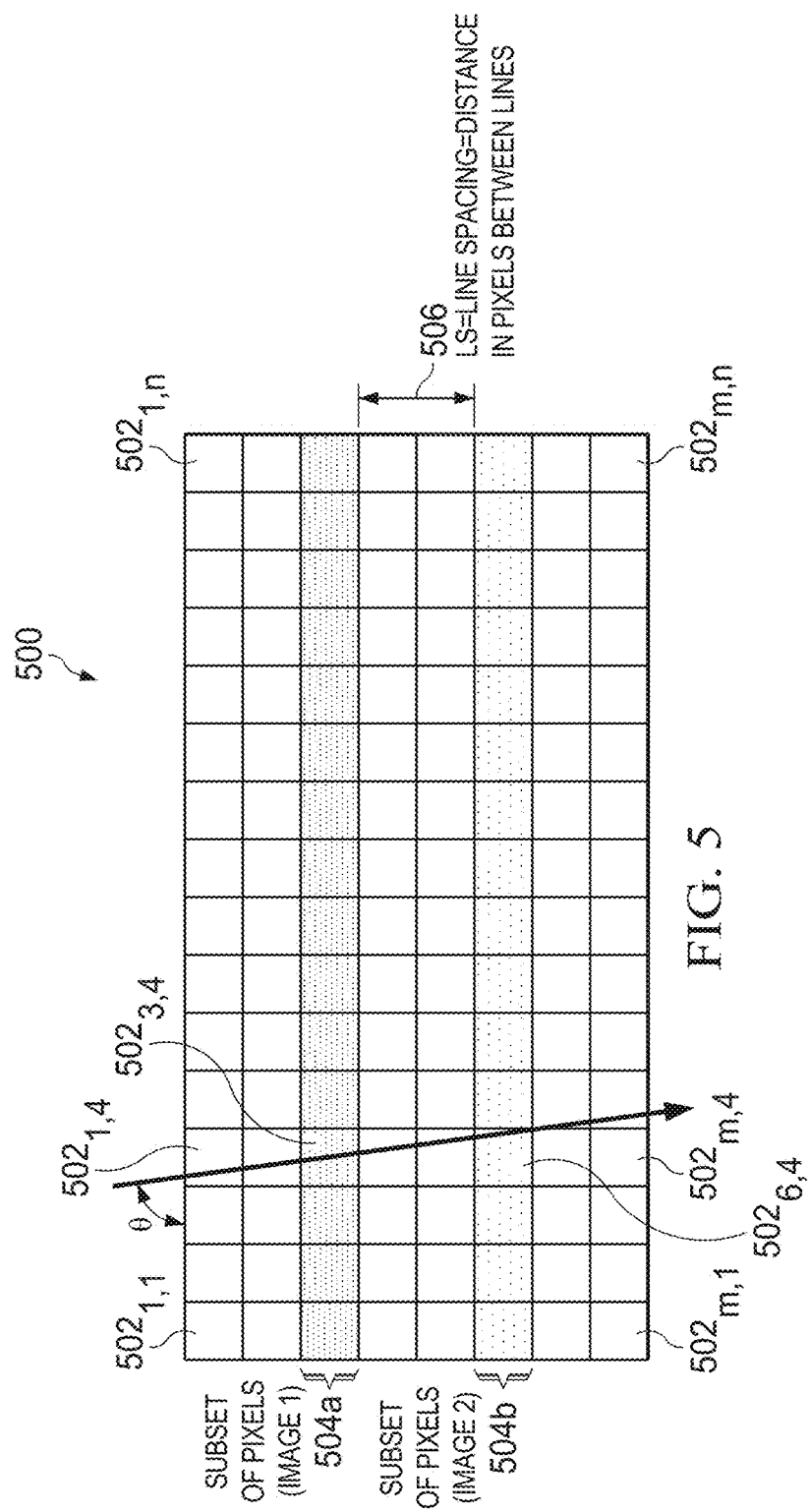
FIG. 5 is an illustration of an illustrative pixel array showing two subsets of pixels of a pixel array used to image a code on an object.

In operation, the camera 104 may be configured with the pixel array 106 that is low resolution (e.g., 2 megapixels). The camera 104 may designed to use subsets of pixels of the pixel array 106 that provide for slightly different views of the same scene such that each frame does not contain exactly the same content or information. To achieve the slightly different views, the subsets of pixels of the pixel array 106 may be separated in distance, such has having one or more rows of unused pixels between subsets (e.g., two rows) of pixels, such as shown in FIG. 5. In one embodiment, no unused rows of pixels between two subsets of pixels may be use, but angle relative to direction of motion of a conveyer may be high (e.g., 10 degrees or higher). Alternatively, the subsets of pixels of a pixel array may be configured with offset pixels, such as the pixel array shown in FIG. 8. Because the object 108 and/or label 110 may vary in position, height, and size, the camera 104 is to capture a wide area, thereby reducing the resolution of images being captured. As a result of imaging or capturing low-resolution images, processing of the multiple, low-resolution images captured by the subsets of pixels of the pixel array 106 is performed.

More particularly, to process the low-resolution images, each low-resolution frame is to be shifted a non-integer number of pixels relative to the others. Correlation of unknown motion between frames is possible, but computationally expensive. Hence, intentionally sampling the images at known non-integer pixel shifts may be made to make computation of high-resolution images. Because the object 108 is moving on the conveyer belt 116, shutter timing may be controlled to ensure a known, non-integer pixel offset between the images in the direction of travel of the object 108. In one embodiment, a two-dimensional (2D) sensor may be tilted or rotated relative to the direction of travel of the conveyer belt 116 (see FIG. 4) to ensure a non-integer pixel shift in direction across the conveyer belt 116.

Figure 2:
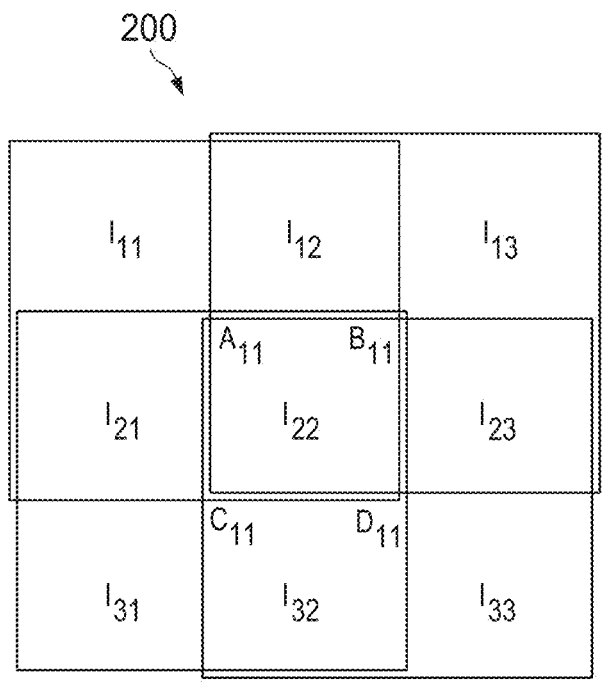
FIG. 2 is an illustration of an illustrative matrix showing alignment between low-resolution pixels (A, B, C, D) and high-resolution pixels (I)

With regard to FIG. 2, an illustration of an illustrative matrix 200 showing alignment between low-resolution image pixels ($A_{11}$, $B_{11}$, $C_{11}$, $D_{11}$) and high-resolution image pixels ($I_{1,1}$-$I_{3,3}$) is shown. In performing a super-resolution process, multiple low-resolution pixels $A_{11}$, $B_{11}$, $C_{11}$, $D_{11}$ may be captured at half the desired final resolution. The low-resolution pixels $A_{11}$, $B_{11}$, $C_{11}$, $D_{11}$ are shown (slight offsets for clarity) to be aligned with a half-pixel shift, where a half-pixel shift causes portions of the low-resolution pixels $A_{11}$, $B_{11}$, $C_{11}$, $D_{11}$ to overlap. TABLE I shows four images that have sub-pixel registration:

TABLE I

| Sub-Pixel Registration | |
|---|---|
| Image | Half Pixel Shift Direction |
| 1 | Nominal |
| 2 | Right |
| 3 | Down |
| 4 | Right and Down |

As shown, low-resolution pixel $A_{11}$ in part forms four high-resolution pixels $I_{11}$, $I_{12}$, $I_{21}$, $I_{22}$; low-resolution pixel $B_{11}$ in part forms four high-resolution pixels $I_{12}$, $I_{13}$, $I_{22}$, $I_{23}$; low-resolution pixel $C_{11}$ in part forms four high-resolution pixels $I_{21}$, $I_{22}$, $I_{31}$, $I_{32}$; and low-resolution pixel $D_{11}$ in part forms four high-resolution pixels $I_{22}$, $I_{23}$, $I_{32}$, $I_{33}$.

In forming the high-resolution pixels, a combined image P may be formed by mapping or interleaving multiple, low-resolution images, as provided in Equation 1 below. By interleaving the multiple, low-resolution images, an image with double resolution over the low resolution sampled images may be produced, thereby reducing complexity and cost of physical components that would otherwise be used to produce the higher resolution image.

$$P = \begin{bmatrix} A_{1,1} & B_{1,1} & A_{1,2} & B_{1,2} & & A_{1,N} & B_{1,N} \\ C_{1,1} & D_{1,1} & C_{1,2} & D_{1,2} & \cdots & C_{1,N} & D_{1,N} \\ A_{2,1} & B_{2,1} & A_{2,2} & B_{2,2} & & A_{2,N} & B_{2,N} \\ C_{2,1} & D_{2,1} & C_{2,2} & D_{2,2} & & C_{2,N} & D_{2,N} \\ & & \vdots & & & \vdots & \\ A_{M,1} & B_{M,1} & A_{M,2} & B_{M,2} & \cdots & A_{M,N} & B_{M,N} \\ C_{M,1} & D_{M,1} & C_{M,2} & D_{M,2} & & C_{M,N} & D_{M,N} \end{bmatrix} \quad \text{Equation 1}$$

In determining the relationship between the low-resolution and high-resolution images, the following mathematical process may be utilized. First, image interleaving definitions may be established by the following equations that provides for a relationship between the high-resolution and low-resolution pixels measured by the pixel array 106.

Let I=High Resolution Image (HRI) of size 2M×2N, as provided in Equation 1.

Let $I_{r,c}$=High Resolution Pixel (HRP) at row r column c

Let A, B, C, D=Four M×N low-resolution Images (LRIs). It should be noted that the four low-resolution images may be formed using two images at multiple sample times, as further described herein.

Let $X_{r,c}$=low-resolution pixel (LRP) from LRI X at row r column c, where

X=one of the HRIs A, B, C, D.

Relationship Between LRPs and HRPs:

$$A_{i,j} = I_{2i-1,2j-1} + I_{2i-1,2j} + I_{2i,2j-1} + I_{2i,2j} \quad \text{Equation 2}$$

$$B_{i,j} = I_{2i-1,2j} + I_{2i-1,2j+1} + I_{2i,2j} + I_{2i,2j+1} \quad \text{Equation 3}$$

$$C_{i,j} = I_{2i,2j-1} + I_{2i,2j} + I_{2i+1,2j-1} + I_{2i+1,2j} \quad \text{Equation 4}$$

$$D_{i,j} = I_{2i,2j} + I_{2i,2j+1} + I_{2i+1,2j} + I_{2i+1,2j+1} \quad \text{Equation 5}$$

A rectangular blurring kernel k (Equation 6) may represent a low-resolution pixel.

$$k = \begin{bmatrix} 1 & 1 \\ 1 & 1 \end{bmatrix} \quad \text{Equation 6}$$

The combined image P (Equation 1) is computed by Equation 7, which is the high resolution image convolved with the blurring kernel k.

$$P = I * k \quad \text{Equation 7}$$

Deconvolution may thereafter be performed to compute the high-resolution image, as provided in Equation 8.

$$I = P * k^{(-1)} \quad \text{Equation 8}$$

Equations 9 and 10 provide for Fourier Domain representations to determine the high-resolution image I. Two problems exist as represented by these equations, (i) for higher frequencies, F(k) is zero (or very close to zero), and thus not directly invertible, and (ii) k is not an exact representation of the physical system due to the point spread function of the lens, diffraction, alignment error, etc.

$$F(I) = \frac{F(P)}{F(k)} \quad \text{Equation 9}$$

$$I = F^{-1}\left(\frac{F(P)}{F(k)}\right) \quad \text{Equation 10}$$

With regard to FIG. 3A, an image of an illustrative low-resolution image 300a of a code 302 captured using a single array of pixels of an imaging device is shown. The single array of pixels may be a single row of pixels of a 2D pixel array. As shown, pixelation of the code 302 is relatively high such that it is difficult to resolve individual lines 304a-304n (collectively 304) and spaces 306a-306n (collectively 306) between the lines 304 that form the code 302. For example, space 306g between two lines 304g and 304h.

With regard to FIG. 3B, an image of an illustrative high-resolution image 300b formed by interleaving at least two low-resolution images is shown. In the high-resolution image 302b, the code 302 is shown with increased resolution (i.e., smaller pixels, which are half-sized compared to FIG. 3A), so that the code 302 is able to be resolved by a code reading algorithm. Because the interleaving algorithm utilized estimation mathematics, a certain amount of blurriness results. However, the amount of blurriness in the high-resolution image is small enough to be handled by a code reading algorithm.

With regard to FIG. 3C, an image of an illustrative de-blurred high-resolution image 300c is shown. The de-blurred, high-resolution image 300c shows the code 302 to have more distinct lines 304 and spaces 306. In particular, the space 306g between lines 304g and 304h is more resolved than shown in image 300b. Using a de-blurring or image sharpening algorithm, a code reading algorithm is more able to resolve the lines 304 and spaces 306 of the code 302.

Figure 4:
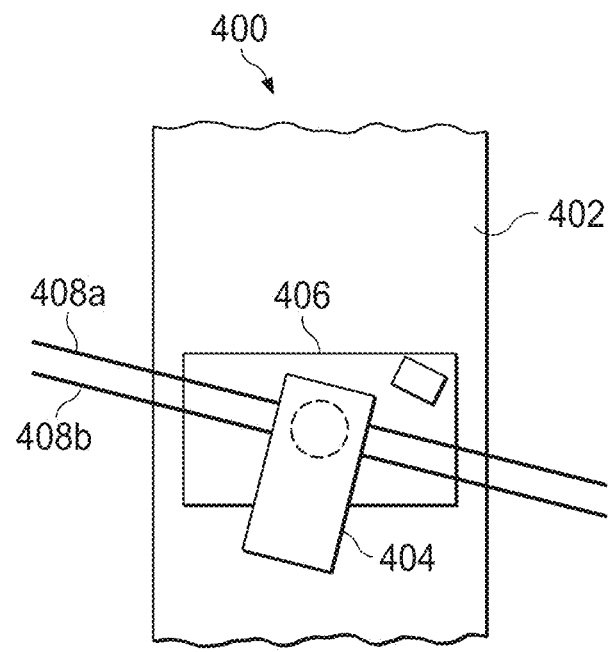
FIG. 4 is an illustration of an illustrative logistics processing environment in which a conveyer belt is used to move objects and an imaging device inclusive of a dual-line scan camera is rotationally oriented relative to the direction of travel of the conveyer belt.

With regard to FIG. 4, an illustration of an illustrative logistics processing environment 400 in which a conveyer belt 402 is used to move objects and an imaging device inclusive of a camera 404, such as a dual-line scan camera, is rotationally oriented (e.g., 1° angle) relative to the direction of travel of the conveyer belt is shown. An object 406 is shown to be moving from top to bottom along the conveyer belt 402, and the camera 404 is shown to be imaging the object 406 with a pair of image scans 408a and 408b (collectively 408). The angle relative to the direction of travel of the conveyer belt 402 ensures a half-pixel shift between the set of imaging regions of interest indicated by the pair of image(s) 408a. An illumination device is not shown, but as described further herein, may be multi-spectral so as to cause images of the lines to be more distinct to be more easily resolved. The configuration of a camera (not shown) positioned sideways to capture side-mounted codes on the objects positioned on the conveyer belt 402 may utilize a similar rotation in producing super-resolution images of codes. Similarly, if a camera(s) were positioned to capture fronts and backs of objects on the conveyer belt 402, angular rotation of those cameras would enable super-resolution processing of the codes, as well. The changes in object distance, and hence changes in resolution, between imager lines in the same frame may be accommodated for by any of the camera configurations.

With regard to FIG. 5, an illustration of an illustrative pixel array 500 composed of pixels $502_{1,1}$-$502_{m,n}$ (collectively 502) showing two subsets of pixels 504a and 504b (collectively 504) of the pixel array 500 used to image a code on an object is shown. In one embodiment, the subsets of pixels 504 are defined as rows within the pixel array 500 that are separated by line spacing 506, which include a number of rows of unused pixels. As shown, two rows of unused pixels define the line spacing 506, but alternative number of rows of unused pixels may be used. In an alternative embodiment, rather than the subsets of pixels 504 being complete rows, portions of rows of pixels may be utilized.

In operation, the subsets of pixels 504 may be used to image codes, and each of the pixels along the subsets of pixels 504 define low-resolution pixels that are utilized to form the high-resolution images, as previously described. Although the two subsets of pixels 504 form two lines, four image pixels (e.g., line 1 (subset of pixels 504a) generates image pixels A and C, and line 2 (subset of pixels 504b) generates image pixels B and D). As shown, an angle θ that shows a rotation between the pixel array 500 and direction of motion of objects on a conveyer belt or other motion device, is shown. The angle θ is set by establishing a distance that the object travels between image frames from the first subset of pixels 504a to the second subset of pixels 504b and shifts approximately ½ pixel in a horizontal direction across a vertical line of pixels.

TABLE I provides an example of the low-resolution pixel images that are collected as mapped into assigned image pixels in a matrix. As shown, subsets of pixels 504 of the pixel array 500 are sampled at different times or frames, and each of the pixels along the subsets of pixels 504 are used to populate a matrix of image pixels that are stored in a memory and processed, as previously described.

TABLE I

Low-Resolution Pixel Assignments

| Time | Pixel of Pixel Array | Assigned Pixel in Matrix |
|---|---|---|
| $T_0$ | $502_{3,4}$ | $A_{11}$ |
| $T_1$ | $502_{3,4}$ | $C_{11}$ |
| $T_2$ | $502_{3,4}$ | $A_{21}$ |
| $T_3$ | $502_{3,4}$ | $C_{21}$ |
| $T_{0+\alpha}$ | $502_{6,4}$ | $B_{11}$ |
| $T_{1+\alpha}$ | $502_{6,4}$ | $D_{11}$ |
| $T_{2+\alpha}$ | $502_{6,4}$ | $B_{21}$ |
| $T_{3+\alpha}$ | $502_{6,4}$ | $D_{21}$ |

Figure 6:
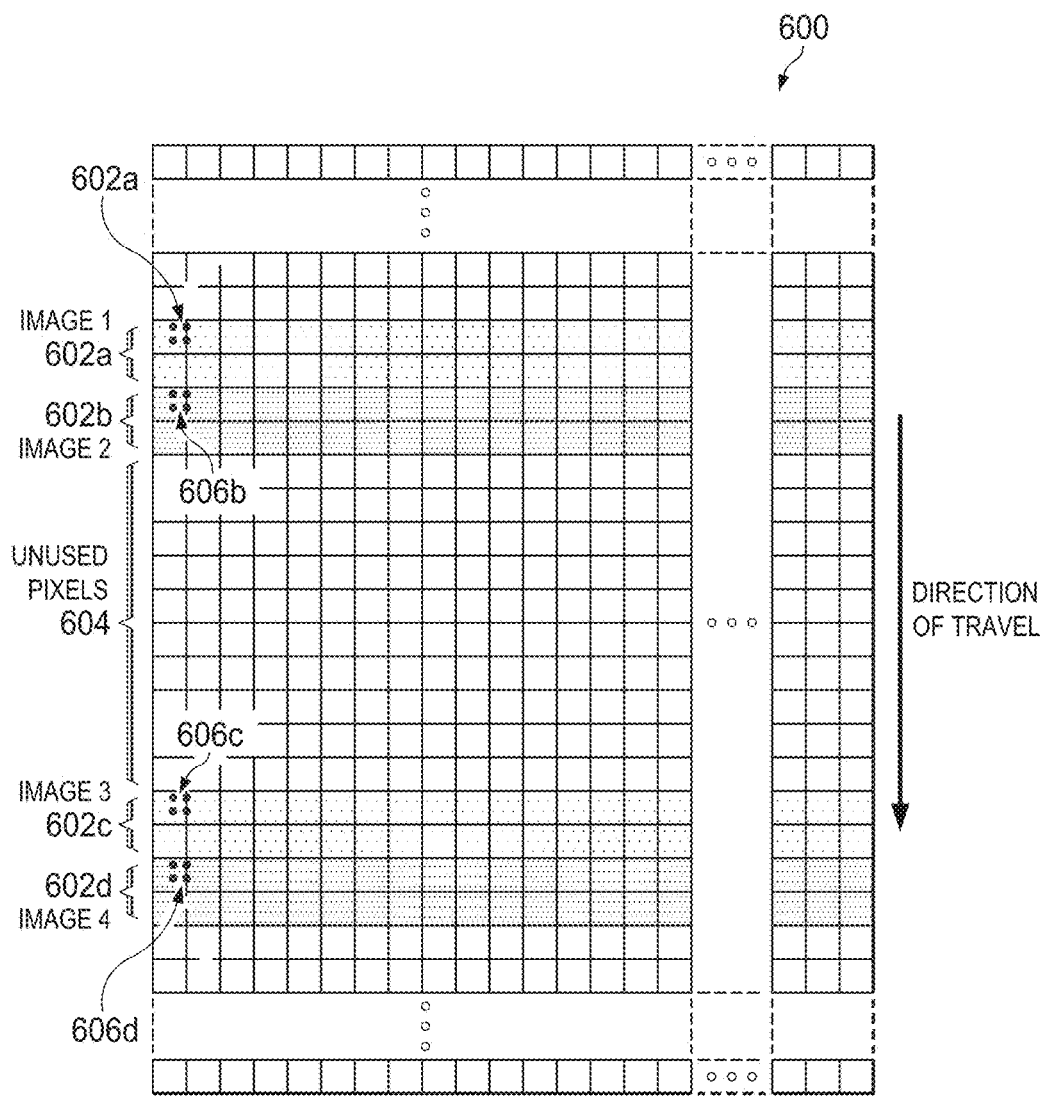
FIG. 6 is an illustration of an alternative pixel array showing four subsets of pixels of a pixel array used to image a code being moved relative to an imaging device in which the pixel array is being operated.

With regard to FIG. 6, an illustration of an alternative pixel array 600 showing four subsets of pixels 602a-602d (collectively 602) of the pixel array 600 used to image a code being moved relative to an imaging device in which the pixel array 600 is being operated is shown. The subsets of pixels 602 in this case are shown to each include a pair of rows that are used to create four images. The first two subsets of pixels 602a and 602b are separated from the second two subsets of pixels 602c and 602d by unused pixels 604, which accommodates an amount of time separating image frames captured by the first pair of subsets of pixels 602a and 602b and second pair of subsets of pixels 602c and 602d. The number of rows of unused pixels 604 may be based on distance from objects, angle of the pixel array 600 with respect to the direction of movement of the objects, and movement distance of the objects during imaging. It should be understood that alternative configurations may be utilized in accordance with the processes described herein.

As shown, a group of imaged dots 606a, 606b, 606c, and 606d (collectively 606) are shown. The imaged dots 606 are illustrative of a portion of a code being imaged by each of the subsets of pixels 602. As shown, each of the subsets of pixels 602 image the dots 606 at different times as the dots move in front of the pixel array 600 and at different horizontal positions along vertical lines of pixels as a result of the pixel array 600 being rotationally oriented with respect to a conveyer belt on which an object including the dots is moving. More specifically, the dots 606 are half-pixel shifted between subset pixels 602a, 602b and subset pixels 602c, 602d, which provides for the multi-frame, super-resolution imaging to be performed.

In operation, a frame rate is set so that each frame is taken every 1.5 pixels of conveyor belt travel. For example, image 1 captured by subset of pixels 602a is formed by sampling a region of interest (ROI) every 1.5 pixels of conveyer belt motion. Image 2 is captured by offsetting vertically from image 1 by 1.5 pixels. Images 3 and 4 are offset from images 1 and 2 by approximately ½ pixel in the horizontal direction as a result of rotation of the pixel array 600 so that the direction of motion is not parallel to the sensor columns, and by leaving an appropriate number of unused rows 604 between the subsets of pixels 602a, 602b and 602c, 602d. Resulting from this imaging process is a super-resolution image using a standard 2D pixel array (sensor) 600 that supports multiple regions of interest. A corresponding process may be performed using the pixel array 500 of FIG. 5.

Figure 7:
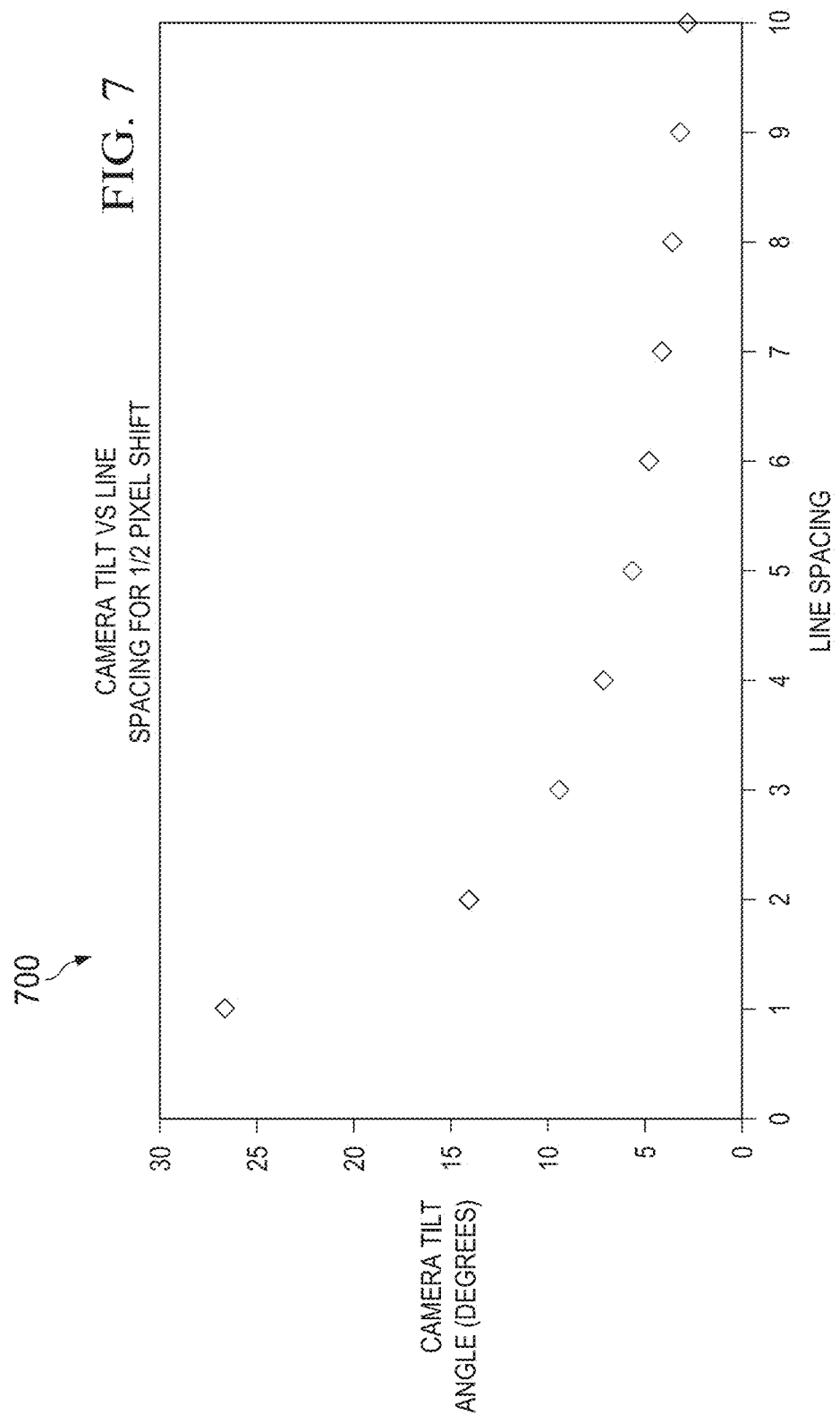
FIG. 7 is a graph inclusive of a dot curve showing how camera tilt angle is a function of line spacing between subsets of pixels of a pixel array for a half-pixel shift.

With regard to FIG. 7, a graph inclusive of a dot curve 700 showing how camera tilt angle is a function of line spacing between subsets of pixels of a pixel array for a half-pixel shift. As shown, for a line spacing of 1 between subsets of pixels, the camera tilt or rotation with respect to a direction of travel of objects is approximately 27 degrees to produce a ½ pixel shift. For a line spacing of 2, the camera tilt angle is approximately 14 degrees to produce a ½ pixel shift. For a line spacing of 6, the camera tilt angle is approximately 5 for a ½ pixel shift. It should be understood that the line spacing and tilt or rotation angles may be defined by dimensions of a specific pixel array being utilized.

Once camera tilt and row spacing is fixed, the distance or range can be inferred by combining information on conveyer position or speed as determined from encoder pulses received. That is, encoder pulses and frame rate determine the absolute vertical shift extent. At each distance, a certain number of vertical pixels correspond to an absolute vertical shift. By shifting the two images vertically until there is an overlap of the images and counting how many pixels the shift corresponds, distance is determined. Using this process, a vertical sub-pixel shift can be achieved, and a vertically super-resolved image may be created. The vertical sub-pixel shift is achieved by sampling at least twice as fast as native resolution (e.g., 65 dots per inch (DPI)) of the imaging device. For example, if a final resolution of 130 DPI is desired, sampling the sensor at the appropriate speed to obtain 130 lines per inch (LPI) is performed. If sampling is performed at twice the native resolution, then acquired images will appear stretched by double in the vertical direction. In one embodiment, two images may be acquired (i.e., a first image by a first subset of pixels and a second image by a second subset of pixels) as a moving object is being scanned, and those images are combined in a single step. If four images are acquired, those four images may be combined in a single step, as described herein. These acquired images are initially super-resolved in the direction of travel because of the high sample rate.

Figure 8:
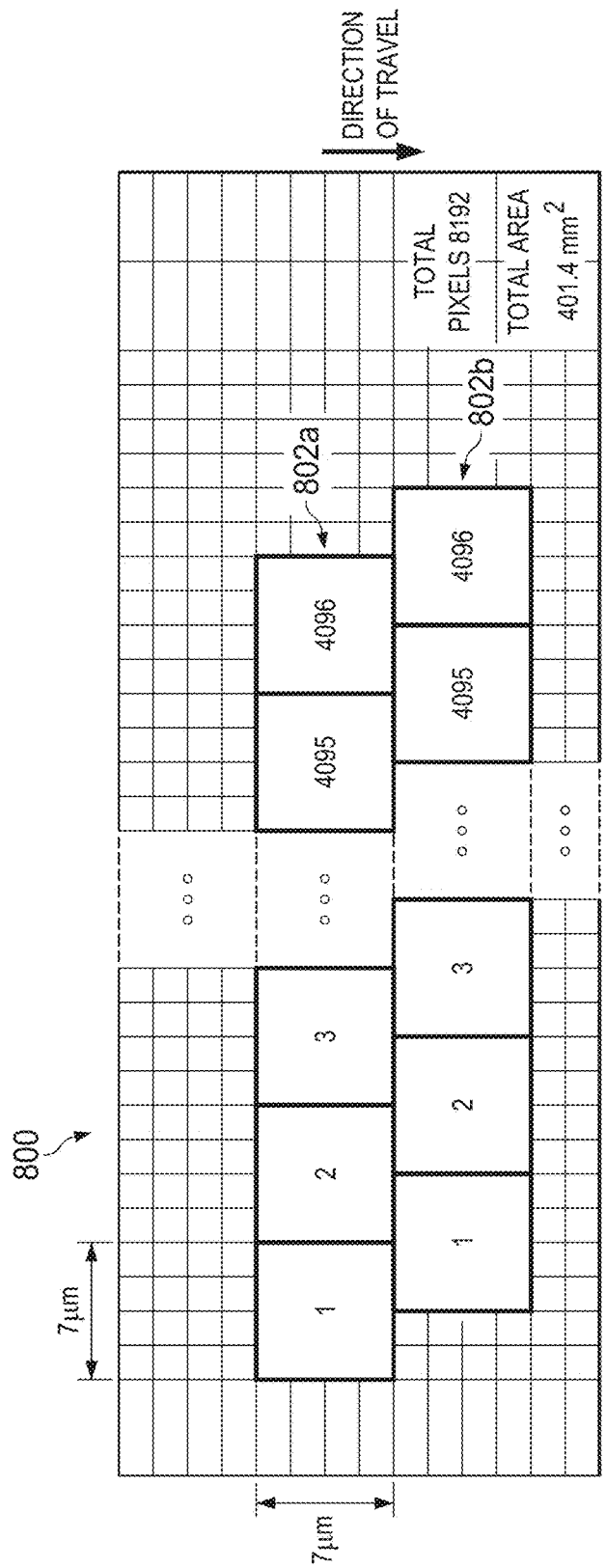
FIG. 8 is an illustration of an illustrative pixel array or multi-line linear sensor that is defined by two subsets of pixels of the pixel array that are offset, and used to image a code on an object.

With regard to FIG. 8, an illustration of an illustrative pixel array or multi-line linear sensor 800 that is defined by two subsets of pixels 802a and 802b (collectively 802) of the pixel array 800 that are offset, and used to image a code on an object is shown. The pixels are dimensioned as 7 μm×7 μm, and each row is 4K pixels long. It should be understood that alternative dimensions and lengths are possible. Each of the subsets of pixels 802 are shown to be offset by a half-pixel, which allows for the pixel array 800 to be aligned relative to a direction of travel of a conveyer belt without being tilted or rotated as half-pixel imaging is inherently created by the configuration of the pixel array 800 itself. A vertical half-pixel shift is achieved by a 2× oversampling (i.e., sampling each line one time for every ½ pixel of conveyer travel). A multiline linear sensor with half-pixel horizontal shift is commercially available from Dynamax.

Figure 9:
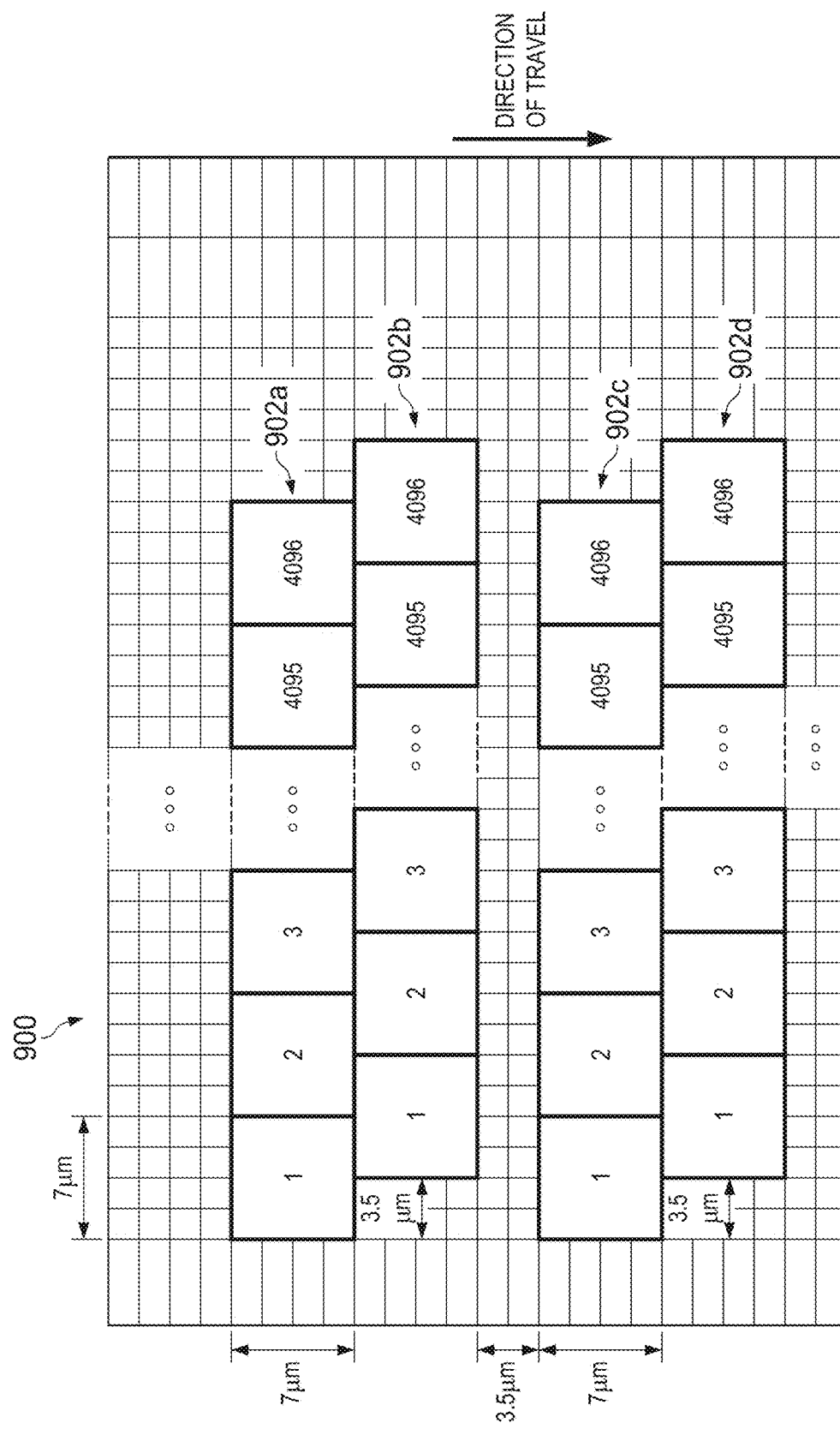
FIG. 9 is an illustration of another illustrative pixel array showing four subsets of pixels of a pixel array that are offset, and used to image a code on an object.

With regard to FIG. 9, an illustration of another illustrative pixel array 900 showing four subsets of pixels 902a, 902b, 902c, and 902d (collectively 902) of the pixel array that are offset used to image a code on an object is shown. The pixel array 900 arrangement shows a design that creates four images with half-pixel shift in each direction. Utilizing the pixel array 900 enables a sampling rate that is half of the sampling rate of the pixel array 800 of FIG. 8. It should be understood that alternative pixel array configurations is also possible.

Figure 10:
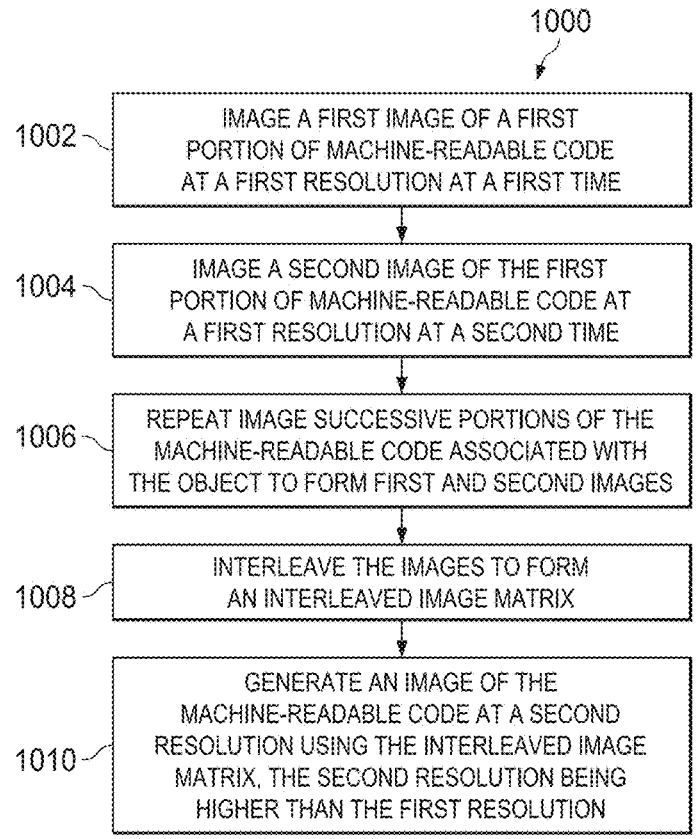
FIG. 10 is a flow diagram of an illustrative process for forming a high-resolution image of a code from multiple, low-resolution images of the code.

With regard to FIG. 10, a flow diagram of an illustrative process 1000 for forming a high-resolution image of a code from multiple, low-resolution images of the code is shown. The process 1000 may start at step 1002, where a first image of a first portion of machine-readable code at a first resolution at a first time is imaged. The machine-readable code may be a barcode, QR code, alphanumeric, symbol, or other image that may be read and identified by a computing device. In imaging the first image, a two dimensional sensor may be rotated around and axis that is perpendicular to a direction of motion of a conveyer surface by an angle, as described with regard to FIG. 7. The first image may be captured by a subset of pixels (e.g., row of pixels) of a pixel array.

At step 1004, a second image of the first portion of machine-readable code at the first resolution may be imaged at a second time with a non-integer pixel shift between the first and second images. The first and second subsets of pixels have a non-integer pixel shift in alignment relative to the first portion of the machine readable code. The second image may be captured by a second subset of pixels (e.g., row of pixels) of the pixel array that is space vertically by a predetermined number of pixels. At step 1006, imaging may be repeated in successive portions of the machine-readable code associated with the object to form first and second images of the machine-readable code. The successive portions may be along a vertical path to image the code. In one embodiment, the successive portions include a continuous path along the entire code or at least a sufficient portion of the code that is determined to enable a code reader to be able to read the code (e.g., minimum distance). In one embodiment, a photo eye may be positioned along the conveyer (e.g., along a plane of the imaging device) that detects when an object is within view of the imaging device to cause the imaging device to start and stop imaging. Alternative techniques may be utilized to determine when to start and stop imaging a machine-readable code. By a proper selection of the rotation angle and row spacing, a one half pixel shift can be achieved. The non-integer pixel shift may be a ½ pixel shift that enables resolution of a combined image to be doubled. Other non-integer pixel shifts may be utilized, as well, to increase resolution of a combined image. Calculating a shift between two images is used so that the two captured images may be combined together. Calculation of range of an object may be utilized in resolving the code. For example, range may be used to determine a particular filter to use, as further described herein. In one embodiment, the non-integer pixel shift is approximately one-half pixel, where being approximate is less than 1/10th of a pixel and may vary due to approximations in computations or alignment of pixels in a pixel array.

At step 1008, the first and second images may be interleaved to form an interleaved image of pixels at the first resolution that, when interleaved, form an image of the machine-readable code at a second resolution, where the second resolution is higher than the first resolution. The interleaving may be performed to accommodate a configuration of a pixel array (or multiple pixel arrays) and subsets of the pixel array(s). For example, if a standard pixel array is utilized, two images captured by the first subset of pixels and two images captured by the second subset of pixels that may be separated by unused pixels along a direction of travel of a conveyer used to move objects in front of the pixel array, may be interleaved in a matrix format, as previously described with respect to FIGS. 2 and 5, and stored in an appropriate memory storage format. If two pair of subsets of pixels of a pixel array are utilized, four images from the two pair of subsets of pixels may be interleaved to form the high-resolution image, The pixel array may be rotated relative to the conveyer to cause a non-integer (e.g., half-pixel) shift between the first and second subset of pixels for a certain distance of travel of an object. An image of the machine-readable code at a second resolution using the interleaved image may be generated at step 1010. In generating the machine-readable code at the second resolution, the machine-readable code may be generated in memory and optionally displayed on a visual display.

More particularly, in performing super-resolution imaging, images of the same scene have non-integer shifts between the images. In one embodiment, two subsets (e.g., rows) of pixels (see, for example, FIG. 5) may be used. The sensor may be tilted such that a half-pixel shift between the two subsets of pixels in the horizontal direction exists. The physical alignment of the subsets of pixels is how a non-integer shift in the horizontal direction is established.

To achieve the non-integer shift in the vertical direction, the rows of pixels are oversampled (i.e., sampled faster than the object moves). In an ideal case, the moving object is sampled in exactly half-pixel intervals. If the range to the object is know, such an exact sampling can be performed. However, if the range to the object is unknown, sampling may be performed at a fixed rate that guarantees that the minimum pixel shift between samples of the same row is at a half-pixel. However, for some ranges, the pixel shift may be less, such as a one-third (⅓) pixel shift. By oversampling, the vertical direction is guaranteed to have non-integer pixel shifts. In this embodiment, the non-integer shift may be at most a one-half pixel shift. In other embodiments where range is known, multiple rows of pixels may be used and slower sampling rates (e.g., 1.5 for example) may be used to achieve non-integer shift in the vertical direction.

Once two images are captured, one from each row of pixels, because of the high sampling rate, the resolution of each image in the vertical direction is already super-resolved (2× or higher). However, in the horizontal direction, the resolution of each image is still the nominal 1×. Because the first and second images are horizontally offset by one-half pixel, the image columns may be interleaved to produce an image that is super-resolved in both axes (e.g., horizontal at 2× resolution, vertical at 2× or higher resolution). Before interleaving the columns of the two images, vertically alignment of the two images may be performed by shifting one of the images vertically. The number of pixels used to shift to achieve vertical alignment may be any number greater than 0, and such a vertical alignment shift does not have to be non-integer (i.e., an integer shift may be performed). In one embodiment, the shift may be accurate to less than one pixel (i.e., sub-pixel accuracy). For example, the shift value may be 0.1, 0.5, 1.0, 5.63, 8.7, etc. pixels, and the shift is a function of the sampling rate and the range to the object. For example, if there are two rows of unused pixels between the subsets of pixels, and the sampling rate is known to be exactly 2.0× the pixel size at a given range, the resulting images should be offset by 2.0*(2+1)=6.0 pixels. However, if the range is unknown, then the shift that varies proportionally with range is to be determined. This last step of determining the vertical alignment between the two images may be performed between two sub-images that are already super-resolved in the vertical direction so there is no need for non-integer shift in the vertical direction as the two images are being aligned so that when the columns are interleaved, the interleaved image looks correct.

Figures 11A, 11B:
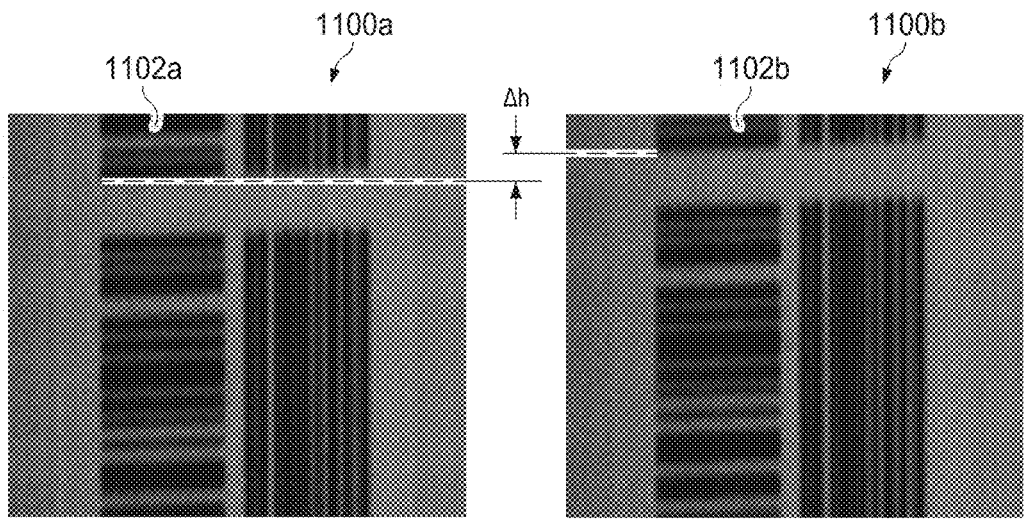
FIGS. 11A and 11B are illustrations of an illustrative pair of codes imaged from a first subset pixel array and a second subset pixel array, respectively.

With regard to FIGS. 11A and 11B, illustrations of an illustrative pair of code images 1100*a* and 1100*b* imaged from a first subset pixel array and a second subset pixel array, respectively, are shown. Each of the code images 1100*a* and 1100*b* are shown in both horizontal and vertical orientations. The codes depicted in the images 1100*a* and 1100*b* are actually square, but appear rectangular because of a high sampling rate in the direction of travel. The image 1100a is captured as images A and C (as described with regard to FIG. 2 and FIG. 5, for example).

In order to combine the code images 1100a and 1100b, a vertical shift between the images is to be known. An offset or difference in height Δh between images captured by different subset of pixels in a pixel array is shown. In one embodiment, a shift may be calculated directly from height information from an external rangefinder. In an alternative embodiment, image processing may be utilized to determine the offset Δh.

As generally understood, correspondence in stereo cameras is difficult. However, for the specific case of imaging codes on objects, the problem is less difficult due to certain system constraints, including (i) offset direction being known, (ii) search range being limited to a few pixels, (iii) illumination difference between images being negligible, and (iv) perspective difference between images being negligible. One embodiment of a process for determining image shift is provided in FIG. 12.

Figure 12:
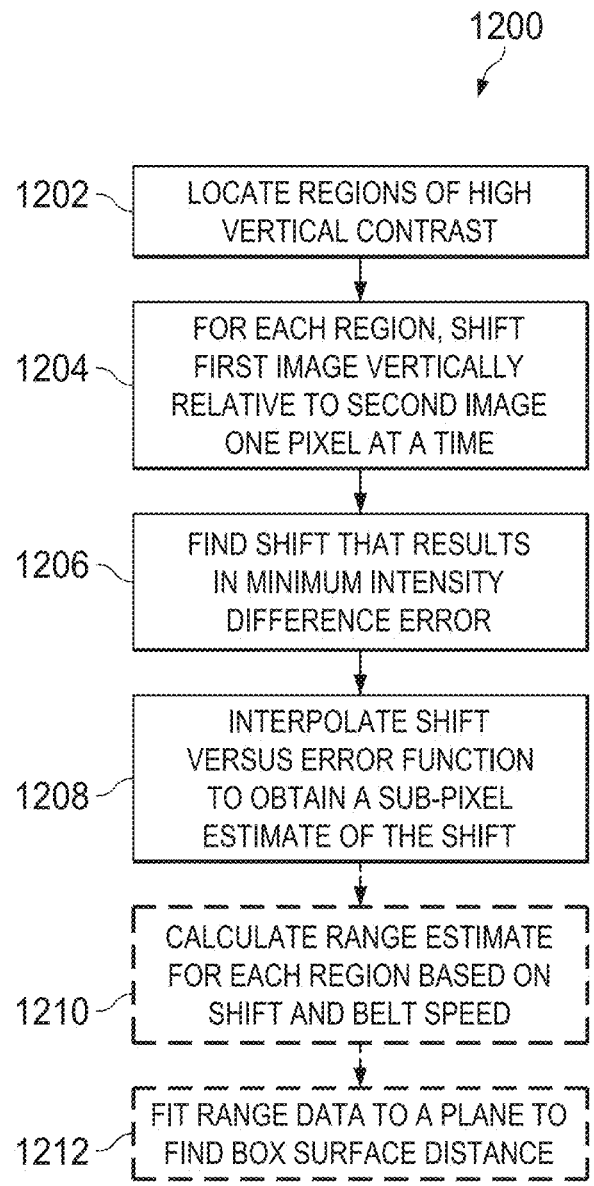
FIG. 12 is a flow diagram of an illustrative process for determining offset of an image of a code captured from two subsets of pixels of a pixel array for use in forming a high-resolution image of the code.

With regard to FIG. 12, a flow diagram of an illustrative process 1200 for determining offset of an image of a code captured from two subsets of pixels of a pixel array for use in forming a high-resolution image of the code is shown. The process 1200 may start at step 1202, where regions of high vertical contrast may be located (see FIG. 14). High vertical contrast indicates where a transition between light and dark regions, such as at the end of lines of a barcode, exist along a vertical axis. At step 1204, for each located region, a first image may be shifted vertically relative to a second image one pixel at a time (see FIG. 15). The first and second images may be those collected from two subset of pixels of a pixel array, as previously described. At step 1206, a shift that results in minimum intensity difference error may be determined (see FIG. 15). At step 1208, a shift versus error function to obtain a sub-pixel estimate of the shift to register the first and second images may be interpolated. The interpolation may utilize a parabolic fit to determine sub-pixel resolution between images for alignment accuracy. An optional step 1210 may include calculating a range or distance estimate for each region based on a shift and belt speed. The range estimate may be a range of the imaging device to the object for use in selecting an appropriate filter, for example. Another optional step 1212 may be performed to fit range data to a plane to find a box (object) surface distance.

Figure 13:
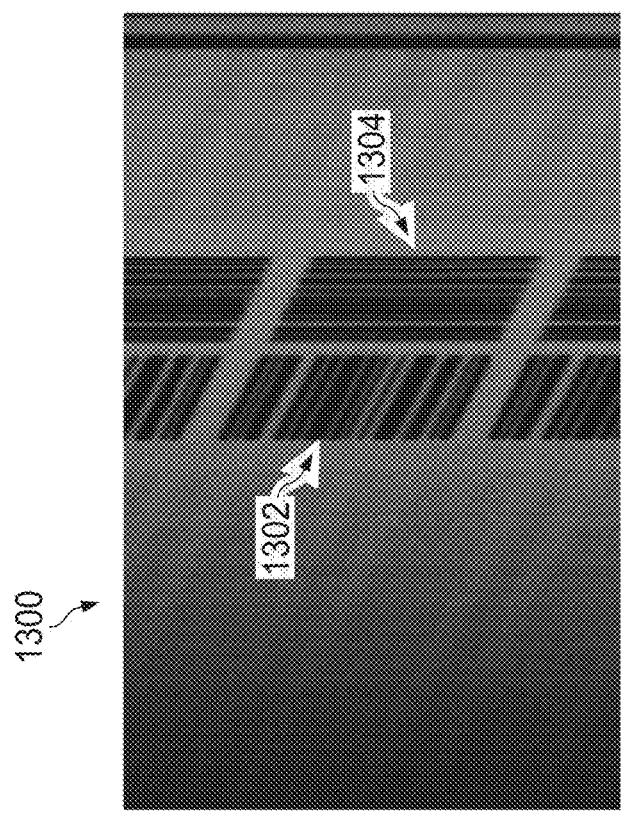
FIG. 13 is an illustration of an illustrative code to be scanned and processed.

With regard to FIG. 13, an illustration of an illustrative code 1300 to be scanned and processed is shown. The code 1300 is shown in both horizontal and vertical orientations 1302 and 1304. Angular rotation θ of the code 1300 in the two orientations 1302 and 1304 are as a result of angular rotation of a pixel array relative to a direction of motion of a conveyer. The code 1300 in the two orientations 1302 and 1304 are shown to be elongated as a result of sample rate of the pixel array in imaging the code 1300.

Figure 14:
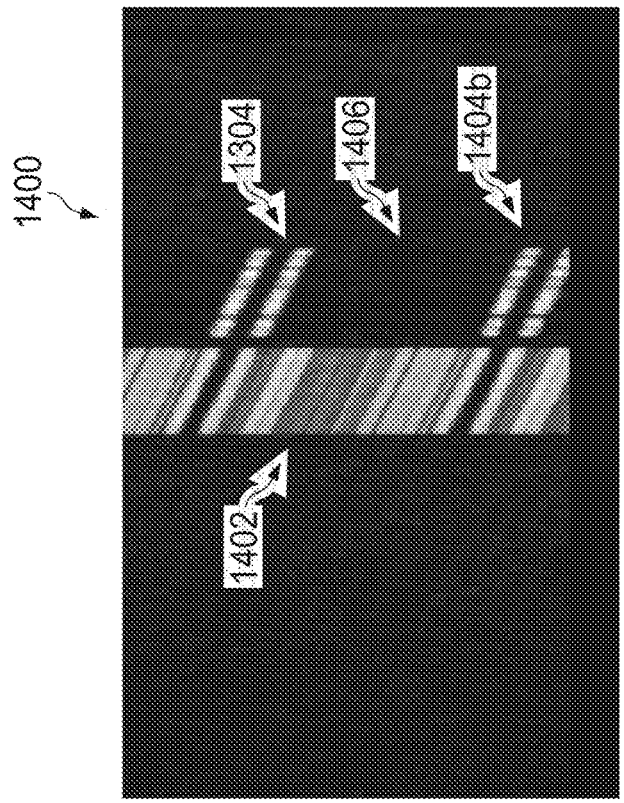
FIG. 14 is an illustration of an illustrative vertical contrast map that indicates where regions of high vertical contrast exist in the code of FIG. 13.

With regard to FIG. 14, an illustration of an illustrative vertical contrast map 1400 that indicates where regions of high vertical contrast exist in the code 1300 of FIG. 13 is shown. As previously described, the high vertical contrast indicates where a transition between light and dark regions, such as at the end of lines of a barcode, exist along a vertical axis. In one embodiment, if a subset of pixels, such as seven pixels, are used in imaging a window of the code 1300, then when imaging a transition of the code against a background, some of the pixels are light and others are dark. A contrast value may be determined by subtracting a maximum value from a minimum value of the subset of pixels. A high contrast value may be indicative of a high contrast, and a low contrast value may be indicative of a low contrast within that window defined by the subset of pixels. Contrast image 1402 is representative of contrast identified from the imaged horizontal orientation 1302 of the code 1300, and contrast images 1404a and 1404b (collectively 1404) are representative of high contrast identified from the imaged vertical orientation 1304 of the code 1300. Area 1406 that is shown without a bright region is indicative of how low contrast values (i.e., contrast values produced from a maximum value minus minimum value within a subset of pixels of a pixel array) exists along the code 1300 in the vertical orientation 1304. In summary, the use of producing vertical contrasts provides for identification of horizontal lines of a code.

The resulting contrast images 1402 and 1404 are used for further processing of the code 1300. The contrast image 1402 is shown to include a lot of bright spots as compared to the contrast images 1404, and thus, the contrast image 1402 includes more information than the contrast images 1404. These contrast images 1402 and 1404, and in one embodiment, may be used for the processing, where the contrast images 1404 may be utilized to define where the code 1300 starts and stops, while the contrast image 1402 is used to provide specific detail of the code 1300 itself. In one embodiment, the contrast images 1404 are used to find a vertical shift between two images of the code 1300. In one embodiment, the contrast images 1404 may be used as a mask used for filtering purposes, as further described herein.

Figure 15:
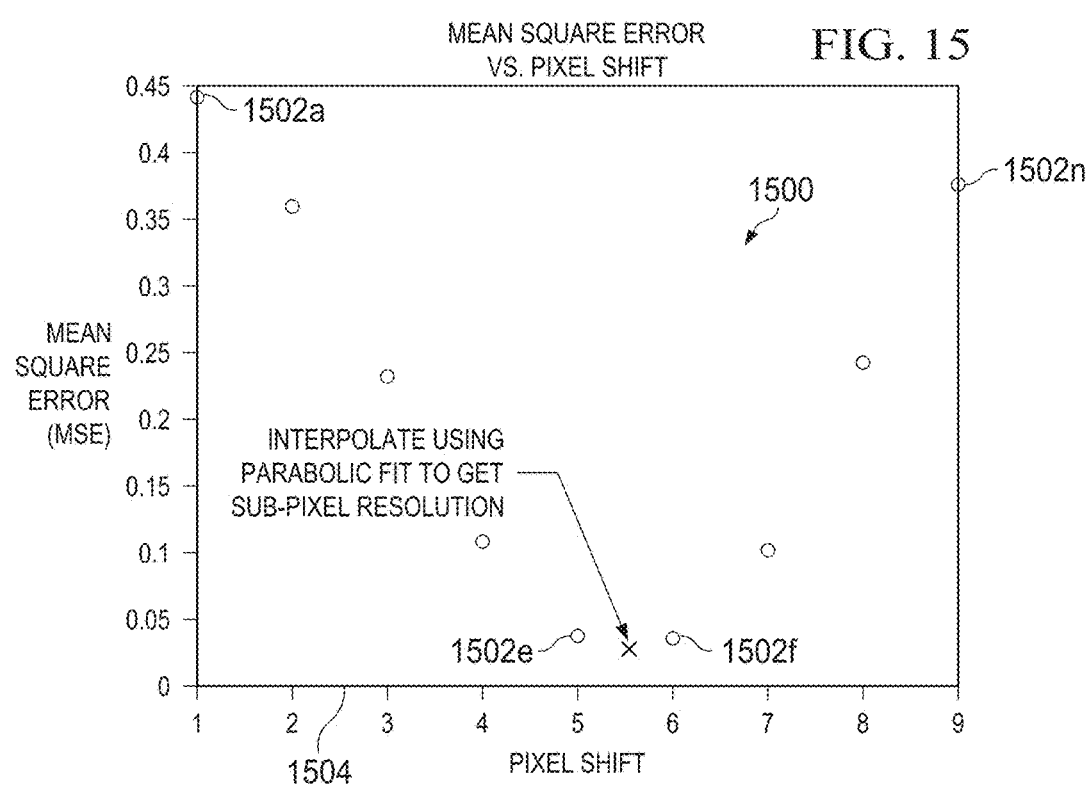
FIG. 15 is a graph of an illustrative mean square error versus pixel shift curve used to determine optimal sub-pixel alignment of images captured by multiple subsets of a pixel array.

With regard to FIG. 15, a graph of an illustrative mean square error versus pixel shift curve 1500 used to determine optimal sub-pixel alignment of images captured by multiple subsets of a pixel array is shown. In this case, the curve 1500 is represented by a number of mean square error (MSE) points 1502a-1502n (collectively 1502) that are marked at integer pixel shift values 1504. The pixel shift values 1504 represent a number of pixels that an image is shifted with respect to another image to determine closest registration (i.e., where the two images of vertically aligned). As shown, MSE points 1502e and 1502f have the lowest values, and in interpolation using a parabolic fit may be used to identify sub-pixel resolution of best alignment between two images in a vertical axis so that the images are substantially aligned (e.g., less than $\frac{1}{10}$th of a pixel alignment), in this particular embodiment. It should be understood that multi-dimensional alignment may be performed for alternative embodiments utilizing the process described with regard to FIG. 15. It should be understood that alternative interpolation functions may be utilized.

Figure 16:
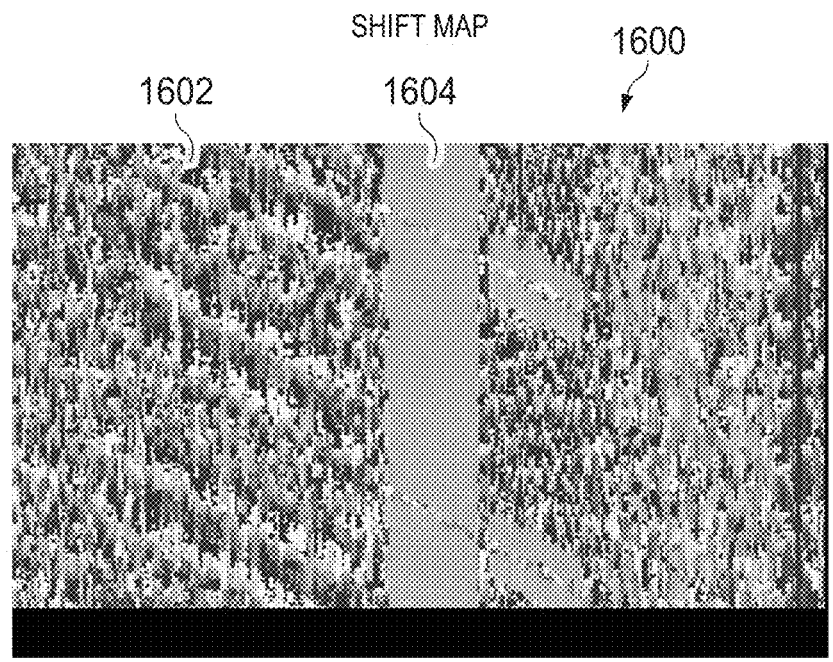
FIG. 16 is an illustration of an illustrative shift map derived from the code of FIG. 13.

With regard to FIG. 16, an illustration of an illustrative shift map 1600 derived from the code of FIG. 13 is shown. The shift map 1600 represents areas in which low-contrast regions 1602 are represented with varying gray scales, while areas in which high-contrast regions 1604 are represented with a constant grayscale level. In this embodiment, a window size of 1×7 pixels is used.

Figure 17:
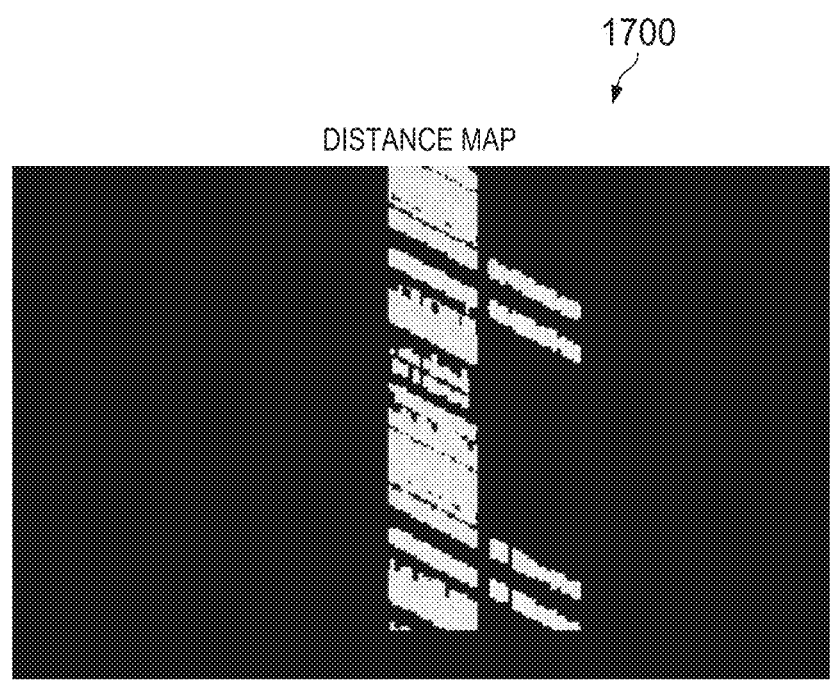
FIG. 17 is an illustration of an illustrative distance map derived from the code of FIG. 13.

With regard to FIG. 17, an illustration of an illustrative distance map 1700 derived from the code of FIG. 13 is shown. The distance map 1700 illustrates a distance that is directly proportional to a pixel shift. The pixel shift is the number of pixels that a first image captured by a first subset of pixels of a pixel array is shifted to substantially overlap a second image captured by a second subset of pixels of the pixel array.

Figure 18:
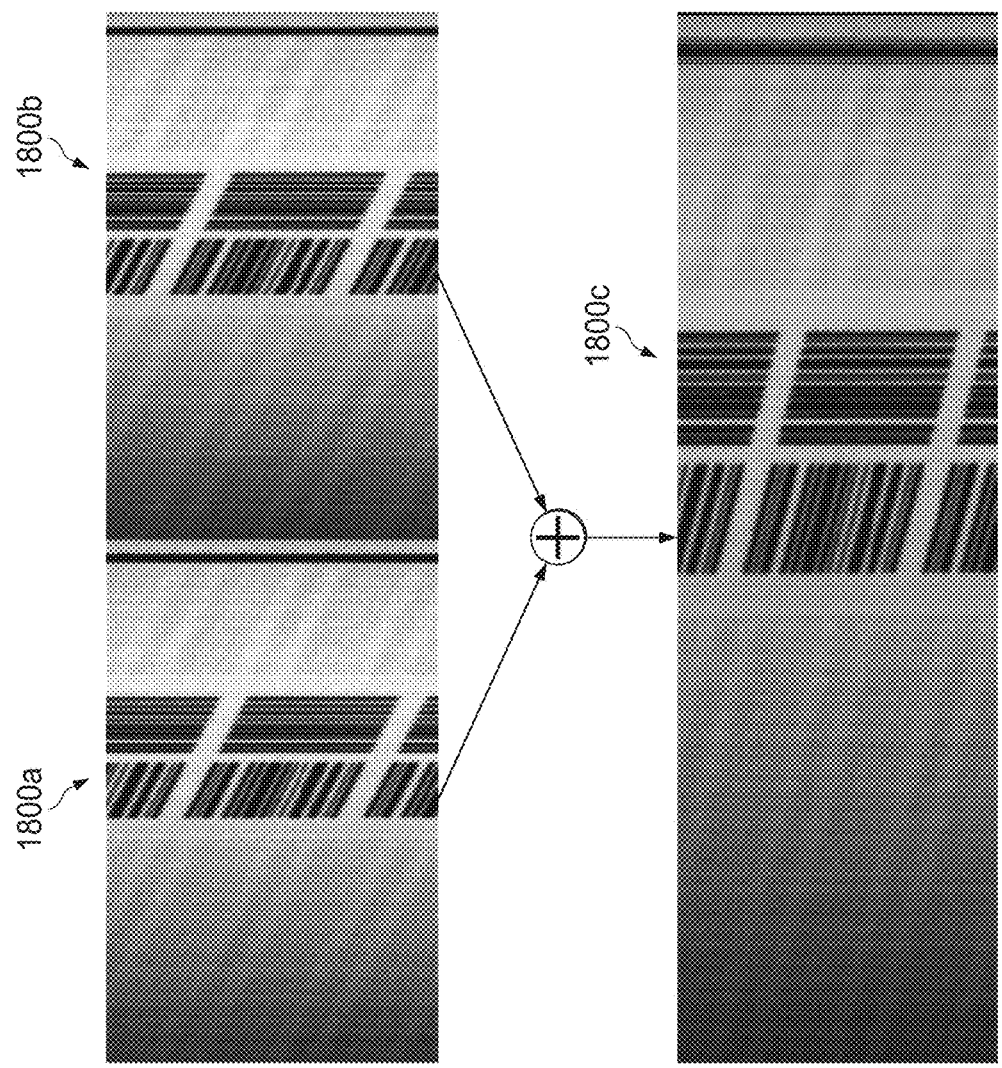
FIG. 18 is a set of illustrations showing a process for summing low-resolution images inclusive of codes to form a high-resolution image as described in FIGS. 2 and 11 by interleaving pixels of image matrices.

With regard to FIG. 18, a set of illustrations showing a process for summing low-resolution images 1800a and 1800b inclusive of codes to form a high-resolution image as described in FIGS. 2 and 11 by interleaving pixels of image matrices is shown. In one embodiment, the resolution of the images 1800a and 1800b is 0.8 pixels per module (PPM), which is typically unreadable or undecipherable by image processing. The image 1800c formed by the combination of images 1800a and 1800b has a resolution that is 1.6 PPM (i.e., double the low-resolution images of 0.8 PPM), which is typically readable or decipherable by image processing. As previously described, angle or sheer of the codes in the images 1800a-1800c as a result of camera tilt or angle relative to the direction of movement of a conveyor.

Figure 19:
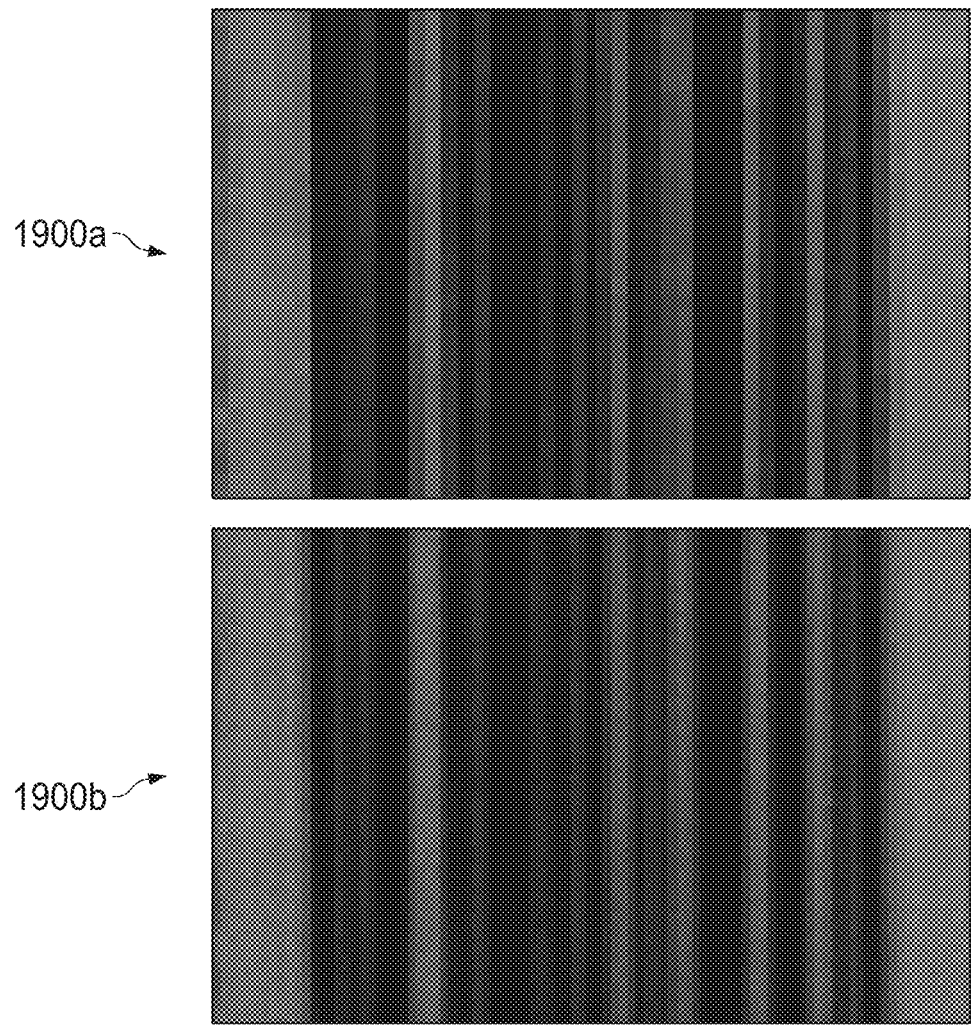
FIG. 19 is an illustration of images of a code in both standard resolution and super-resolution formats.

With regard to FIG. 19, an illustration of images 1900a and 1900b of a code in both standard resolution and super-resolution formats, respectively, is shown. The image 1900a in the standard resolution is shown to be pixelated, while the image 1900b is shown to be less pixelated and have more clearly defined bright space between lines of the code.

Figure 20:
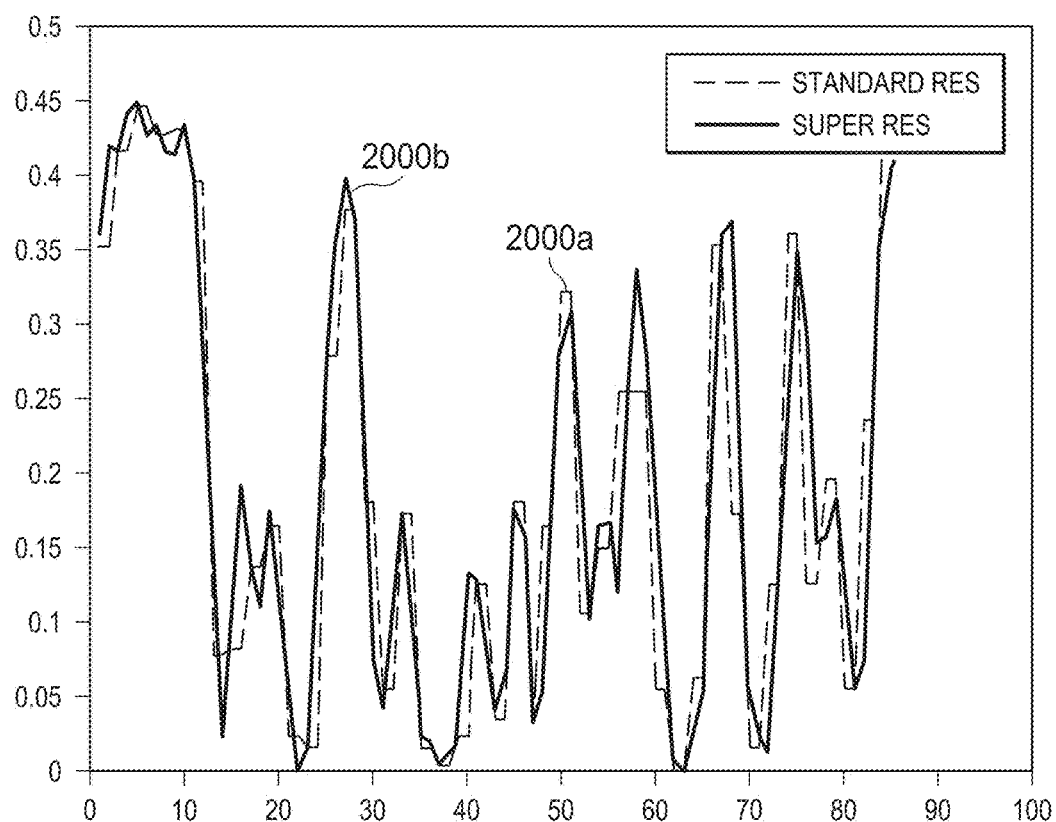
FIG. 20 is a graph showing curves that illustrate measurements of the standard resolution and super-resolution images.

With regard to FIG. 20, a graph showing curves 2000a and 2000b that illustrate measurements of the standard resolution and super-resolution images is shown. As shown, the standard resolution curve 2000a tends to be flatter peak regions, while the super-resolution curve 2000b has sharper curves with higher peaks as a result of the higher resolution being more defined.

Real-Time 2D Deblur in Fixed Focus Code Imager Using Least Squares FIR Filter

Fixed focus cameras have a limited depth-of-field that is a function of optical design and module size of a code, such as a barcode. Techniques to extend the depth-of-field of a fixed focus camera without moving parts provides for the ability to capture and process images from codes that are moving on a conveyor that is relatively fast, as previously described. The ability to image and process 2D images for use in a fixed focus imager, such as a matrix or fixed focus linear camera, may be provided using a least squares FIR filter. One embodiment may include applying an FIR filter in real-time to process 2D codes, such as barcodes, using an FIR filter that was learned from a known calibration image, and selecting an appropriate filter based on range of an imaged code, or, if range information is not available, apply multiple filters and attempting to decode all of the images or selecting the filter in real-time based on measured modulation transfer function from the image. Using a least squares FIR filter may be used as a result of a filter learning process optimizing sharpening of desired frequency content found in training images. As a result, optimal balance of enhancing narrow elements of a code (e.g., lines of a barcode) while minimizing unwanted edge ringing in other noise is provided. In general, reading performance of a fixed focus camera without adding significant cost may be provided utilizing these filtering techniques.

To address the problems, a deblurring filter f that is an estimate for $k^{(-1)}$ may be determined. The deblurring filter f is a 2D filter and can be of any size. Generally, for a 150 DPI barcode, the size off can be about 15×15. In one embodiment, a least squares approach to find f that minimizes the sum of squares of the error $\epsilon$ may be utilized. It should be understood that alternative estimation approaches may be utilized.

$$I + \epsilon = P * f \qquad \text{Equation 11}$$

A set of optimal deblurring filters may be determined by using a known calibration image at various distances. Given a known high-resolution calibration image $I_{cal}$ and the low-resolution image $P_{cal}$ taken by the camera at a known distance, the optimum deblurring filter using least squares may be determined.

$$I_{cal} + \epsilon = P_{cal} * f \qquad \text{Equation 12}$$

The 2D convolution may be replaced by matrix multiplication by rearranging the elements of $P_{cal}$ into a block Toeplitz matrix (Equation 13) and vectorizing $I_{cal}$ (Equation 14).

$$X = P_{cal} \text{ in Block Toeplitz Form} \qquad \text{Equation 13}$$

$$y = I_{cal} \text{ as a column vector} \qquad \text{Equation 14}$$

Equation 12 may be rewritten as provided in Equation 15, and then the least squares estimate for that minimizes £ is obtained by finding the Moore-Penrose Pseudo Inverse of X, as provided in Equation 15.

$$Y + \epsilon = Xf \qquad \text{Equation 15}$$

A filter f, which is a 2D finite impulse response (FIR) filter is determined by Equation 15. The FIR filter f may be applied to the combined image (see FIG. 3B) to generate a sharpened image (see FIG. 3C). In one embodiment, the FIR filter processing may be performed in software, hardware, firmware, or combination thereof using an FPGA or other computing device, and may be performed by a camera that includes such processing capabilities or external from the camera. Because the FIR filter f (Equation 16) changes with range, a table of filters may be stored, selected, and applied based on a determined range. Depending on the quality of the combined image, an FIR filter f need not be utilized (i.e., if the quality of a code is resolvable, no filtering may be needed). That is, the quality may be determined by whether the code is able to be resolved (e.g., identification of code indicia, such as lines for a barcode, and brightness of a background surrounding the indicia).

$$f = (X^T X)^{-1} X^T y \qquad \text{Equation 16}$$

In one embodiment, a normalization blurring kernel k (Equation 17) is a low-pass filter. To simplify the process, a boxcar moving average filter [1, 1] may be utilized, and a frequency response $H(\omega)$ may be produced, as provided in Equation 18.

$$k = \begin{bmatrix} 1 & 1 \\ 1 & 1 \end{bmatrix} \cdot \frac{1}{4} \qquad \text{Equation 17}$$

$$|H(\omega)| = \frac{1}{2} \left| \frac{\sin(\omega)}{\sin(\frac{\omega}{2})} \right| \qquad \text{Equation 18}$$

For a high-resolution image with r pixels per module, a fundamental frequency $\omega$ of the narrow elements may be determined by Equation 19.

$$\omega = 2\Pi \frac{1}{2r} = \frac{\Pi}{r} \qquad \text{Equation 19}$$

The lower the starting resolution of the image, the more blur there is on the narrow elements within a code. The theoretical narrow element modulation versus image resolution is established by pixels per module (PPM) for a starting resolution (e.g., 0.6 PPM may have a gain of about 27%, 0.8 PPM has a gain of about 56%, 1 PPM has a gain of about 70%, 1.2 PPM has a gain of about 80%). Generally speaking, using a super-resolution process with a 2× resolution improvement, 0.5 PPM as a starting resolution may return a 1.0 PPM pixel resolution, and, therefore, be possible, as described herein. That is, by performing a half-pixel shift with multiple images or stereoscopic imaging, resolution is doubled compared to a standard 2D camera with the same lens/sensor.

In addition, field-of-view (FOV) is doubled with the same resolution compared to a standard 2D camera. A standard off-the-shelf 2D sensor may be used as a result of the half-pixel shift image processing that doubles the resolution. The use of multiple images also provides for range finding of codes on objects that may vary in height. Illumination may be performed by a conventional linear illuminator. The camera may be fixed focus, thereby minimizing or eliminating moving parts as compared to a variable focus camera were used. In addition, optics of the camera may be limited to the camera lens as image processing may be used to increase the resolution. In one embodiment, a matrix image sensor may be utilized. Although a variety of processing units may be used, one such processing unit may be a field programmable gate array (FPGA) since such a processing device has sufficient bandwidth to process the images of the codes that are captured.

With regard to FIG. 21, a graph showing curves that illustrate measurements of an original image 2100a, ideal image 2100b, and deblurred image 2100c is shown. The original image 2100a is a low-resolution image, ideal image 2100b is a super-resolution image that includes inherent blurriness as a result of performing estimation and other mathematical techniques, as previously described, and the de-blurred image 2100c is an image that has been sharpened or de-blurred using an FIR filter or other image sharpening process that provides more distinction between indicia of the code as compared to background.

Figure 22:
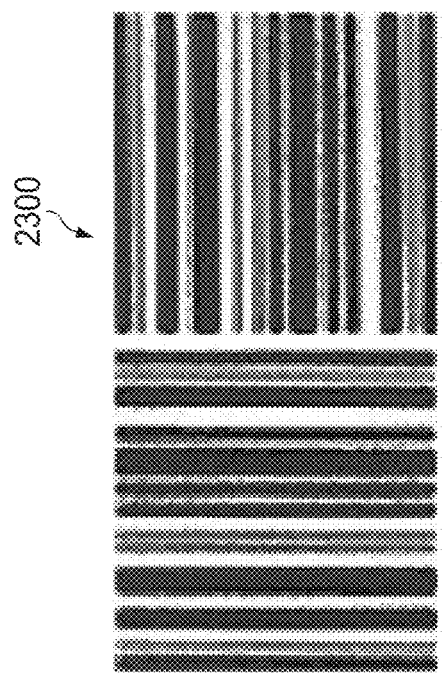
FIG. 22 is an illustration of a pair of codes used for calibration.

With regard to FIG. 22, an illustration of a pair of codes 2200 used for calibration is shown. The calibration codes 2200 are reflective of codes that in imager is likely to image in operation. For example, the codes 2200 are shown in both horizontal and vertical orientations as one or both orientations may be image during an imaging operation. The codes 2200 are shown to have straight lines with sharp edges along white background spacing between the lines. In operation, the calibration images 2200 may be positioned at known distances from a camera. For example, a known distances may have a particular range at which objects may vary in height. A closest range at which objects may be located from the camera may cause the calibration codes 2200 to be out of focus (see FIG. 23). Similarly, a farthest range at which objects may be located from the camera may cause the calibration codes 2200 to be out of focus. Other ranges between closest in farthest ranges may be used to measure the calibration codes 2200, and filter coefficients may be determined based on filtering the calibration codes to be as sharp as possible.

Figure 23:
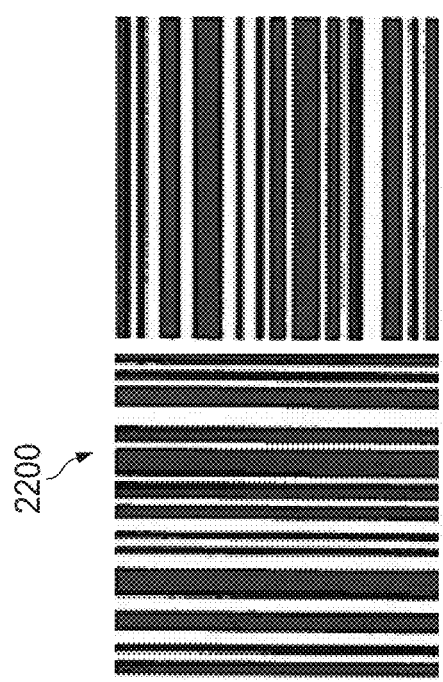
FIG. 23 is an illustration of a pair of codes imaged by an imaging device at a distance that results in the codes being blurry.

With regard to FIG. 23, an illustration of a pair of codes 2300 imaged by an imaging device at a distance that results in the codes being blurry. The codes 2300 may be imaged at multiple distances that are used to establish coefficients of an FIR filter, such as a least squares FIR filter. After imaging the codes 2300, and alignment of an ideal image to the blurred image may be performed. For example, by finding corners of the code and applying inappropriate affine transformations to translate, scale, rotate, and skew a calibration code, such that the ideal image lines up with the blurred image. After the alignment process, an area of interest may be selected to be used to calculate an optimal FIR filter at the distance at which the code is imaged. The selection of the area of interest may include a portion of or an entire image, as provided in FIG. 24. In calculating an optimal FIR filter at the distance, one embodiment may include (a) selecting a filter size (e.g., 11×11 pixels); (b) rearranging the original image section into a 2D convolution matrix X for the given filter size; (c) vectoring the ideal image section (y); and (d) calculating the filter weights using linear least squares (e.g., $\hat{\beta}=(X^TX)^{-1}X^Ty$. After the optimal FIR filter is generated, the filter may be stored in a lookup table based on range at which the code was imaged. The process of generating optimal FIR filters may be performed at different ranges, such that a set of optimal FIR filters is available for real-time processing of codes.

To apply the filters in real time when the distance is known, a determination of the distance to the code may be made. The distance determination may be performed using a range finder, dimensioner, light curtain, or other sensing device or technique. Appropriate filter coefficients of an FIR filter that correspond to the range may be looked up, and applied to an FIR filter being executed by a processing unit, such as an FPGA. Additional processing of the codes, including finding regions of interest (i.e., locating code(s) on a label), decoding the codes, reading the codes, etc., may be performed.

In the case where range is not known, filtering may be performed using two optional processes (amongst many possible techniques). A first process may include attempting to find a region of interest in an image containing a code, measuring modulation (amount of blur) in the region of interest, and selecting FIR filter coefficients based on a level of blur detected. The selection may be automated. A second process may include guessing at the most likely distances to the object, applying multiple filters to the regions of interest in an image to generate multiple sub-images for each image taken, and attempting to decode as many sub-images as time permits.

Figure 24:
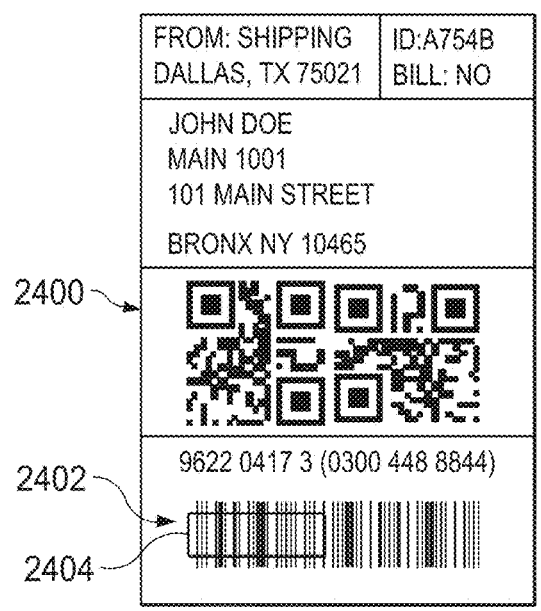
FIG. 24 is an illustration of an illustrative shipping label inclusive of a code that is to be read by an imaging device for processing as described herein.

With regard to FIG. 24, an illustration of an illustrative shipping label 2400 inclusive of a code 2402 that is to be read by an imaging device for processing as described herein is shown. An image window 2404 that includes a portion of the code 2402 may be used to image the code 2402. It should be understood that the image window 2404 may be larger or smaller. In reading the code 2402, an FIR filter determined during calibration, as described above with regard to FIG. 23, may be selected from memory or a data repository based on range that is measured by a sensor or at which the system determines the object to have been imaged.

Figure 25:
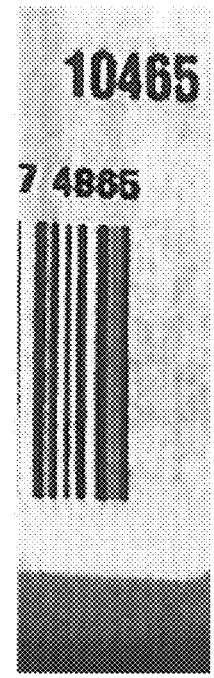
FIG. 25 is an illustration of a portion of the imaged code of the shipping label of FIG. 24 prior to processing.

With regard to FIG. 25, an illustration of a portion of the imaged code 2500 of the shipping label of FIG. 24 prior to processing is shown. As shown, background portions that extend between lines of the code 2500 are shown to be gray, what makes it difficult to read the code with a code reading algorithm.

Figure 26:
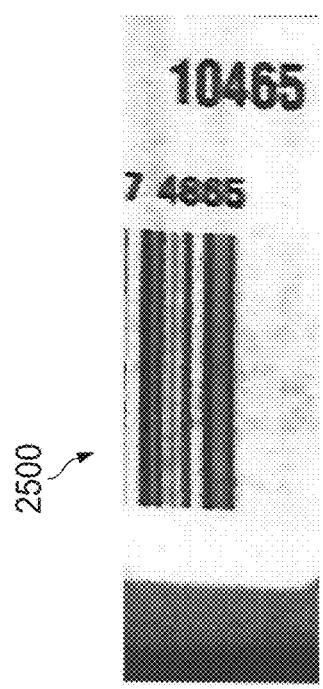
FIG. 26 is an illustration of the portion of the imaged code of FIG. 25 after being sharpened with a deblurring filter.

With regard to FIG. 26, an illustration of the portion of the imaged code 2600 of FIG. 25 after being sharpened with a deblurring filter is shown. As shown, background portions that extend between lines of the code 2600 are brighter than those shown in FIG. 25, and, therefore, easier to resolve the lines of the code 2600 by a code reading process.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A system for reading a machine-readable code associated with an object moving relative to an imaging device, said system comprising:
    an imaging device configured to capture images of the machine-readable code, the imaging device inclusive of a pixel array in which a first subset of pixels images a first portion of the machine-readable code at a first resolution at a first time, a second subset of pixels images the first portion of the machine-readable code at the first resolution at a second time, the first and second subsets of pixels having a non-integer pixel shift in alignment relative to the first portion of the machine readable code; and
    a processing unit in communication with the imaging device, and configured to:
        cause repeated imaging, by the first and second subsets of pixels, of successive portions of the machine-readable code associated with the moving object to form a first image and second image, respectively;
        interleave a plurality of images captured by the first and second subsets of pixels to form an interleaved image;
        generate an image of the machine-readable code at a second resolution using the interleaved image, the second resolution being higher than the first resolution;
        move the object;
        measure distance of movement of the object; and
        synchronize a difference in time between the first and second times based on the measured distance.

2. The system of claim 1, wherein the non-integer pixel shift is approximately one-half pixel.

3. The system of claim 1, wherein the imaging device is rotated with respect to direction of travel of the object relative to the imaging device to ensure a non-integer pixel shift in alignment of the code between the first and second subsets of pixels.

4. The system of claim 1, wherein the processing unit, in imaging, is configured to receive images from first and second rows of pixels of the imaging device that are separated from one another by at least one row of an unused subset of pixels of the pixel array.

5. The system according to claim 1, wherein said processing unit is further configured to register the first and second images with sub-pixel accuracy prior to interleaving the first and second images.

6. The system of claim 1, wherein the processing unit is further configured to deconvolve the interleaved image matrix.

7. The system of claim 6, wherein the processing unit is further configured to filter the interleaved image matrix to produce a filtered image matrix.

8. The system of claim 7, wherein the filter includes a finite impulse response (FIR) filter to filter the interleaved image matrix to produce a sharper image.

9. The system of claim 8, wherein the processing unit is further configured to:
image a calibration target at a known distance from the imaging device;
select an area of interest of the calibration target; and
calculate an optimal FIR filter based on the selected area of interest of the calibration target.

10. The system of claim 1, wherein the machine-readable code is a barcode.

11. The system according to claim 1, wherein the processing unit is further configured to:
determine a range to the object from the imaging device;
select a filter to use to deblur the machine-readable code; and
deblur the code using the selected filter.

12. The system according to claim 1, wherein the processing unit causes the first and second subsets of pixels to sample at least twice as fast as sampling that is performed to produce a native resolution of the imaging device.

13. A method for reading a machine-readable code associated with an object moving relative to an imaging device, said method comprising:
capturing a first image of the machine-readable code at a first resolution;
capturing a second image of the machine-readable code with a non-integer pixel shift in alignment at the first resolution;
forming an interleaved image from the first and second images;
generating an image of the machine-readable code at a second resolution using the interleaved image, the second resolution being higher than the first resolution;
moving the object;
measuring distance of movement of the object; and
synchronizing a difference in time between the first and second times based on the measured distance.

14. The method according to claim 13, further comprising registering the first and second images with sub-pixel accuracy prior to interleaving the first and second images.

15. The method according to claim 13, wherein capturing the first and second images includes sampling at least twice as fast as sampling that is performed to produce a native resolution of an imaging device used to capture the first and second images.

16. The method according to claim 13, further comprising:
deconvolving the interleaved image matrix; and
filtering the interleaved image matrix to produce a filtered image matrix, the filter being a finite impulse response (FIR) filter to filter the interleaved image matrix to produce a sharper image.

17. The method according to claim 13, further comprising:
determining a range to the object from the imaging device;
selecting a filter to use to deblur the machine-readable code; and
debluring the code using the selected filter.

18. A system for reading a machine-readable code associated with an object moving relative to an imaging device, said system comprising:
an imaging device configured to capture images of the machine-readable code, the imaging device inclusive of a pixel array in which a first subset of pixels images a first portion of the machine-readable code at a first resolution at a first time, a second subset of pixels images the first portion of the machine-readable code at the first resolution at a second time, the first and second subsets of pixels having a non-integer pixel shift in alignment relative to the first portion of the machine readable code, the imaging device being rotated with respect to direction of travel of the object relative to the imaging device to ensure a non-integer pixel shift in alignment of the code between the first and second subsets of pixels; and
a processing unit in communication with the imaging device, and configured to:
cause repeated imaging, by the first and second subsets of pixels, of successive portions of the machine-readable code associated with the moving object to form a first image and second image, respectively;
interleave a plurality of images captured by the first and second subsets of pixels to form an interleaved image; and
generate an image of the machine-readable code at a second resolution using the interleaved image, the second resolution being higher than the first resolution.

19. The system of claim 18, wherein the processing unit is further configured to:
move the object;
measure distance of movement of the object; and
synchronize a difference in time between the first and second times based on the measured distance.

20. The system of claim 18, wherein the processing unit, in imaging, is configured to receive images from first and second rows of pixels of the imaging device that are separated from one another by at least one row of an unused subset of pixels of the pixel array.

21. The system according to claim 18, wherein the processing unit is further configured to:
deconvolve the interleaved image matrix; and
filter the interleaved image matrix to produce a filtered image matrix, the filter being a finite impulse response (FIR) filter to filter the interleaved image matrix to produce a sharper image.

22. The system according to claim 18, wherein the processing unit is further configured to:
determine a range to the object from the imaging device;
select a filter to use to deblur the machine-readable code; and
deblur the code using the selected filter.

23. A system for reading a machine-readable code associated with an object moving relative to an imaging device, said system comprising:
an imaging device configured to capture images of the machine-readable code, the imaging device inclusive of a pixel array in which a first subset of pixels images a first portion of the machine-readable code at a first resolution at a first time, a second subset of pixels images the first portion of the machine-readable code at the first resolution at a second time, the first and second subsets of pixels having a non-integer pixel shift in alignment relative to the first portion of the machine readable code; and a processing unit in communication with the imaging device, and configured to:

in imaging, receive images from first and second rows of pixels of the imaging device that are separated from one another by at least one row of an unused subset of pixels of the pixel array;

cause repeated imaging, by the first and second subsets of pixels, of successive portions of the machine-readable code associated with the moving object to form a first image and second image, respectively;

interleave a plurality of images captured by the first and second subsets of pixels to form an interleaved image; and generate an image of the machine-readable code at a second resolution using the interleaved image, the second resolution being higher than the first resolution.

24. The system of claim 23, wherein the processing unit is further configured to:

move the object;

measure distance of movement of the object; and synchronize a difference in time between the first and second times based on the measured distance.

25. The system of claim 23, wherein the imaging device is rotated with respect to direction of travel of the object relative to the imaging device to ensure a non-integer pixel shift in alignment of the code between the first and second subsets of pixels.

26. The system of claim 23, wherein the processing unit is further configured to:

deconvolve the interleaved image matrix; and filter the interleaved image matrix to produce a filtered image matrix, the filter being a finite impulse response (FIR) filter to filter the interleaved image matrix to produce a sharper image.

27. The system according to claim 23, wherein the processing unit is further configured to:

determine a range to the object from the imaging device;

select a filter to use to deblur the machine-readable code; and deblur the code using the selected filter.

28. A system for reading a machine-readable code associated with an object moving relative to an imaging device, said system comprising:

an imaging device configured to capture images of the machine-readable code, the imaging device inclusive of a pixel array in which a first subset of pixels images a first portion of the machine-readable code at a first resolution at a first time, a second subset of pixels images the first portion of the machine-readable code at the first resolution at a second time, the first and second subsets of pixels having a non-integer pixel shift in alignment relative to the first portion of the machine readable code; and a processing unit in communication with the imaging device, and configured to:

cause repeated imaging, by the first and second subsets of pixels, of successive portions of the machine-readable code associated with the moving object to form a first image and second image, respectively;

interleave a plurality of images captured by the first and second subsets of pixels to form an interleaved image generate an image of the machine-readable code at a second resolution using the interleaved image, the second resolution being higher than the first resolution;

determine a range to the object from the imaging device;

select a filter to use to deblur the machine-readable code; and deblur the code using the selected filter.

29. The system of claim 28, wherein the processing unit is further configured to:

move the object;

measure distance of movement of the object; and synchronize a difference in time between the first and second times based on the measured distance.

30. The system of claim 28, wherein the imaging device is rotated with respect to direction of travel of the object relative to the imaging device to ensure a non-integer pixel shift in alignment of the code between the first and second subsets of pixels.

31. The system of claim 28, wherein the processing unit, in imaging, is configured to receive images from first and second rows of pixels of the imaging device that are separated from one another by at least one row of an unused subset of pixels of the pixel array.

32. The system of claim 28, wherein the processing unit is further configured to:

deconvolving the interleaved image matrix; and filtering the interleaved image matrix to produce a filtered image matrix, the filter being a finite impulse response (FIR) filter to filter the interleaved image matrix to produce a sharper image.

* * * * *